US012775196B2

(12) United States Patent
Kaya

(10) Patent No.: US 12,775,196 B2
(45) Date of Patent: Oct. 27, 2026

(54) PRINTER THAT INCLUDES A SUPPORT RIB FOR SUPPORTING INSTANT FILM AND DIGITAL CAMERA INCLUDING PRINTER THAT INCLUDES A SUPPORT RIB FOR SUPPORTING INSTANT FILM

(71) Applicant: FUJIFILM Corporation, Tokyo (JP)

(72) Inventor: Akimasa Kaya, Saitama (JP)

(73) Assignee: FUJIFILM Corporation, Tokyo (JP)

(*) Notice: Subject to any disclaimer, the term of this patent is extended or adjusted under 35 U.S.C. 154(b) by 334 days.

(21) Appl. No.: 18/477,698

(22) Filed: Sep. 29, 2023

(65) Prior Publication Data

US 2024/0036441 A1 Feb. 1, 2024

Related U.S. Application Data

(63) Continuation of application No. PCT/JP2022/015514, filed on Mar. 29, 2022.

(30) Foreign Application Priority Data

Mar. 31, 2021 (JP) ................................ 2021-061453

(51) Int. Cl.

| | |
|---|---|
| ***G03B 17/28*** | (2021.01) |
| ***G03B 17/48*** | (2021.01) |
| ***G03B 27/32*** | (2006.01) |
| ***H04N 23/50*** | (2023.01) |
| ***H04N 23/80*** | (2023.01) |

(52) U.S. Cl.

CPC ............. *G03B 17/28* (2013.01); *G03B 17/48* (2013.01); *G03B 27/32* (2013.01); *H04N 23/50* (2023.01); *H04N 23/80* (2023.01)

(58) Field of Classification Search

CPC ........ G03B 17/28; G03B 17/48; G03B 27/32; G03B 17/52; G03B 2217/26; G03B 2217/265; G03B 2217/268; G03B 17/50; H04N 23/50; H04N 23/80

USPC ...................................................... 348/207.2

See application file for complete search history.

(56) References Cited

U.S. PATENT DOCUMENTS 6,173,120 B1 * 1/2001 Takatori ................ G03B 17/32 396/36
6,195,508 B1 2/2001 Katayama et al.
6,356,712 B1 * 3/2002 Motomura ............ G03B 17/50 396/32

(Continued)

FOREIGN PATENT DOCUMENTS

JP H03-75431 U1 7/1991
JP H10-319516 A 12/1998

(Continued)

OTHER PUBLICATIONS

International Search Report issued in PCT/JP2022/015514; mailed Jun. 7, 2022.

(Continued)

*Primary Examiner* — Usman A Khan
(74) *Attorney, Agent, or Firm* — Studebaker Brackett PLLC

(57) ABSTRACT

A printer unit includes a film pack room, an exposure head, a transport roller pair, a spreading roller, and a support rib. The support rib is provided between the film pack room and the exposure head in a transport direction, and supports an instant film from a side facing the exposure head.

5 Claims, 21 Drawing Sheets

(56) References Cited

U.S. PATENT DOCUMENTS

| | | | | |
|---|---|---|---|---|
| 6,397,007 | B1 * | 5/2002 | Masubuchi | G03B 17/52 347/264 |
| 6,490,413 | B2 * | 12/2002 | Staller | G03B 17/50 396/30 |
| 2002/0071668 | A1 * | 6/2002 | Kitagawa | G03B 17/52 396/30 |
| 2003/0165338 | A1 * | 9/2003 | Mizuno | G03B 17/26 396/518 |
| 2006/0067659 | A1 * | 3/2006 | Takeshita | G03B 17/52 396/36 |
| 2018/0173471 | A1 * | 6/2018 | Kitagawa | G06K 15/1852 |
| 2018/0231873 | A1 * | 8/2018 | Nakai | G03B 17/26 |
| 2018/0231874 | A1 * | 8/2018 | Nakai | G03D 9/00 |
| 2018/0231893 | A1 * | 8/2018 | Sugiyama | G03F 7/2057 |
| 2018/0335690 | A1 * | 11/2018 | Fujii | G03B 27/32 |
| 2018/0373137 | A1 * | 12/2018 | Fujii | G03C 3/00 |
| 2019/0084317 | A1 | 3/2019 | Fujii et al. | |
| 2019/0361336 | A1 * | 11/2019 | Nakai | G03B 17/50 |
| 2020/0089441 | A1 * | 3/2020 | Fujimoto | H04N 1/2112 |

FOREIGN PATENT DOCUMENTS

| | | | |
|---|---|---|---|
| JP | 2000-089351 | A | 3/2000 |
| JP | 2000-356823 | A | 12/2000 |
| JP | 2001-318452 | A | 11/2001 |
| JP | 2005-300838 | A | 10/2005 |
| JP | 2006-159644 | A | 6/2006 |
| JP | 2008-137792 | A | 6/2008 |
| JP | 2019-148612 | A | 9/2019 |
| JP | 2020-043548 | A | 3/2020 |

OTHER PUBLICATIONS

Written Opinion of the International Searching Authority issued in PCT/JP2022/015514; mailed Jun. 7, 2022.

"Notice of Reasons for Refusal" Office Action issued in JP 2023-511387; mailed by the Japanese Patent Office on Aug. 19, 2025.

Extended European Search Report issued in EP 22 78 0940.7-1001 by the European Patent Office on Sep. 12, 2024, which is related to U.S. Appl. No. 18/477,698.

An Office Action; mailed by the China National Intellectual Property Administration of the People's Republic of China on Apr. 18, 2026, which corresponds to Chinese Patent Application No. 202280025709.X and is related to U.S. Appl. No. 18/477,698.

* cited by examiner

PRINTER THAT INCLUDES A SUPPORT RIB FOR SUPPORTING INSTANT FILM AND DIGITAL CAMERA INCLUDING PRINTER THAT INCLUDES A SUPPORT RIB FOR SUPPORTING INSTANT FILM

CROSS-REFERENCE TO RELATED APPLICATIONS

This application is a Continuation of PCT International Application No. PCT/JP2022/015514 filed on 29 Mar. 2022, which claims priority under 35 U.S.C § 119(a) to Japanese Patent Application No. 2021-061453 filed on 31 Mar. 2021. The above application is hereby expressly incorporated by reference, in its entirety, into the present application.

BACKGROUND OF THE INVENTION

1. Field of the Invention

The present invention relates to a printer and a digital camera including a printer.

2. Description of the Related Art

Various mobile printers or digital cameras including a printer for recording images imaged by a digital camera or a smartphone on a recording medium such as an instant film have been on sale.

In general, a printer or a digital camera including a printer that uses an instant film as a recording medium has a configuration comprising a loading room, an exposure head, a transport roller, and a spreading roller. An instant film pack that accommodates a plurality of instant films in a case is loaded into the loading room. The exposure head exposes an image to the instant film transported from the loading room. The transport roller is positioned on a downstream side in a transport direction with respect to the exposure head, and transports the instant film in a state of pinching the instant film. The spreading roller is positioned on a downstream side in the transport direction with respect to the transport roller, and spreads a developer by crushing a developer pod of the instant film (for example, see JP2020-043548A (corresponding to US2020/0089441A1)).

SUMMARY OF THE INVENTION

There are various sizes of instant films as the recording medium, and an instant film called a wide type in which a dimension in a width direction is larger than a dimension in the transport direction is distributed. The present applicant is considering using this wide-type instant film in the above-described printer or digital camera including a printer.

However, in a case where the wide-type instant film is used, it is considered that the instant film is curved in the width direction of the instant film due to an own weight before the instant film discharged from the instant film pack reaches a transport roller pair. In a case where the instant film is transported in a curved state and the exposure is performed by the exposure head and the developer is spread by the spreading roller, for example, there is a possibility that image quality deteriorates such as a case where an image elongated by the amount of curving is exposed or spreading unevenness is caused in the developer.

The present invention has been made to solve the above-mentioned problems, and an object of the present invention is to provide a printer and a digital camera including a printer capable of suppressing curving of an instant film due to an own weight and preventing deterioration in image quality.

In order to solve the above-mentioned problems, a printer according to an aspect of the present invention comprises a loading room, an exposure head, a transport roller, a spreading roller, and a support rib. An instant film pack is loaded into the loading room. The instant film pack comprises at least a plurality of instant films and a case which accommodates the instant films in a stacking manner and that has a feeding port for feeding the instant film formed therein. The exposure head exposes an image to the instant film transported from the loading room. The transport roller is disposed on the downstream side in a transport direction of the instant film with respect to the exposure head, and transports the instant film discharged from the instant film pack to a further downstream side in the transport direction. The spreading roller is disposed on a downstream side in the transport direction with respect to the transport roller, and spreads a developer by crushing the developer pod in a state of pinching the instant film. The support rib is provided between the loading room and the exposure head in the transport direction, and supports the instant film from a side facing the exposure head.

It is preferable that a plurality of the support ribs are provided in a width direction orthogonal to the transport direction, each of the support ribs includes a sliding surface that slides on one surface of the instant film, and the sliding surface is formed in a curved shape.

It is preferable that the support rib is disposed at a position where the support rib is spaced from an orbit of the instant film and the support rib slides in a case where the instant film is curved.

It is preferable that the support rib is formed integrally with a support member that protrudes from the exposure head toward the instant film, and the support member is fixed to the exposure head.

It is preferable that the loading room is formed in a box shape of which one surface is opened, a loading lid that covers the opened surface of the loading room is provided, and a film holding portion is provided in the loading lid, the film holding portion pressing a film press plate stored in the case, and the film holding portion includes a pressing member that touches the film cover member and a biasing member that biases the pressing member, and a plurality of the film holding portions are provided in the width direction and the transport direction in the loading lid. It is preferable that the biasing member is a spring member, and the spring member has a spring constant different for each film holding portion.

A digital camera including a printer according to an aspect of the present invention comprises the printer, and an imaging unit that includes an imaging optical system and images a subject image to output image data to the printer.

According to the present invention, it is possible to suppress the curving of the instant film due to the own weight and prevent the deterioration in the image quality.

DESCRIPTION OF THE PREFERRED EMBODIMENTS

Overview of Digital Camera Including Printer

Figure 1:
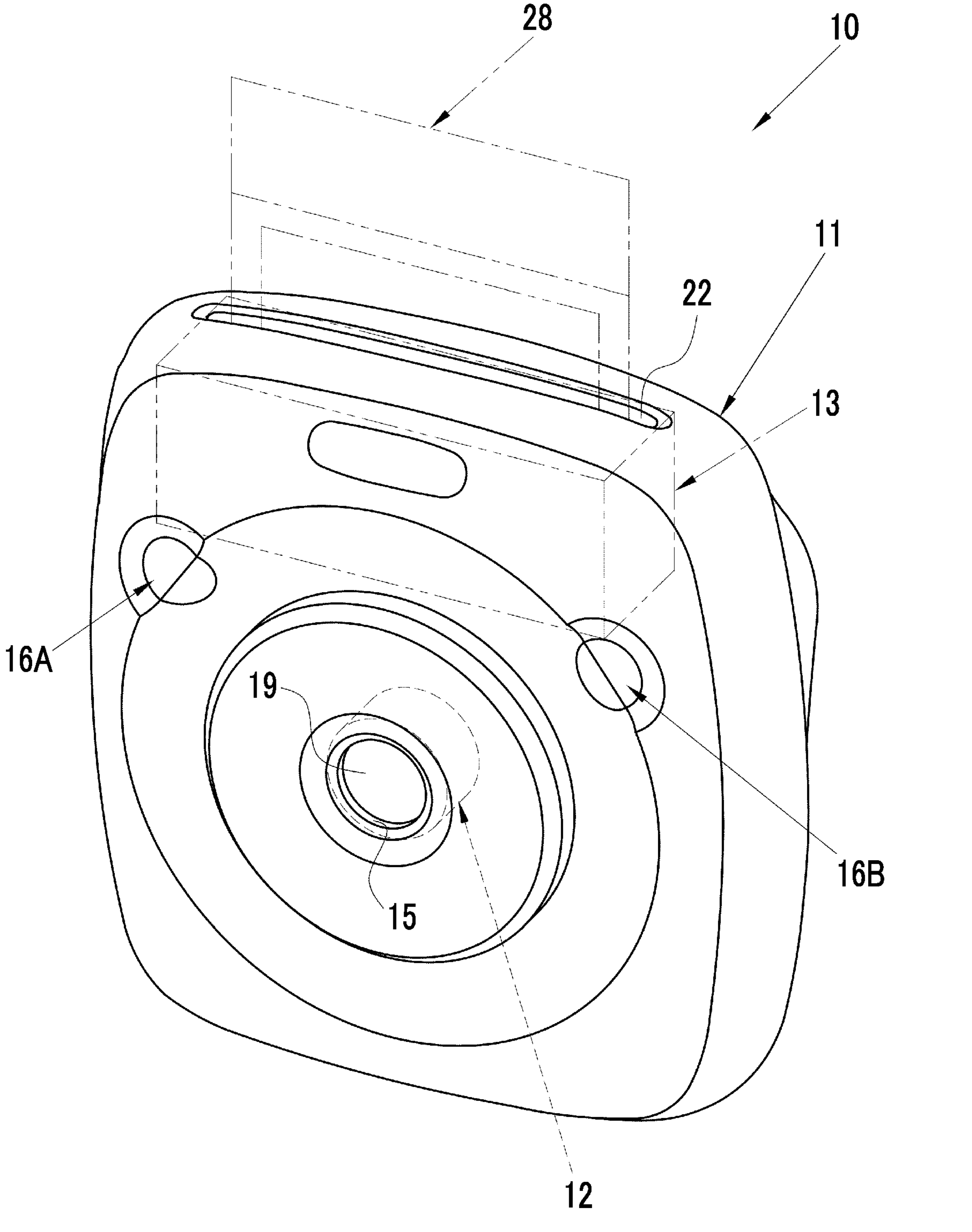
FIG. 1 is a front perspective view of a digital camera including a printer.

In FIG. 1, a digital camera 10 including a printer according to an embodiment of the present invention comprises a camera body 11, an imaging unit 12, and a printer unit 13. An imaging window 15 and two release switches 16A and 16B are provided on a front surface of the camera body 11.

The camera body 11 has a substantially square shape viewed from a front surface. The digital camera 10 including a printer uses instant films 28 (see FIG. 7). The instant film 28 is a wide-type instant film having a dimension in a width direction longer than a dimension in a transport direction.

The imaging window 15 is disposed in a center on the front surface of the camera body 11. The imaging window 15 exposes an imaging optical system 19 (see FIG. 2) constituting the imaging unit 12.

Figure 2:
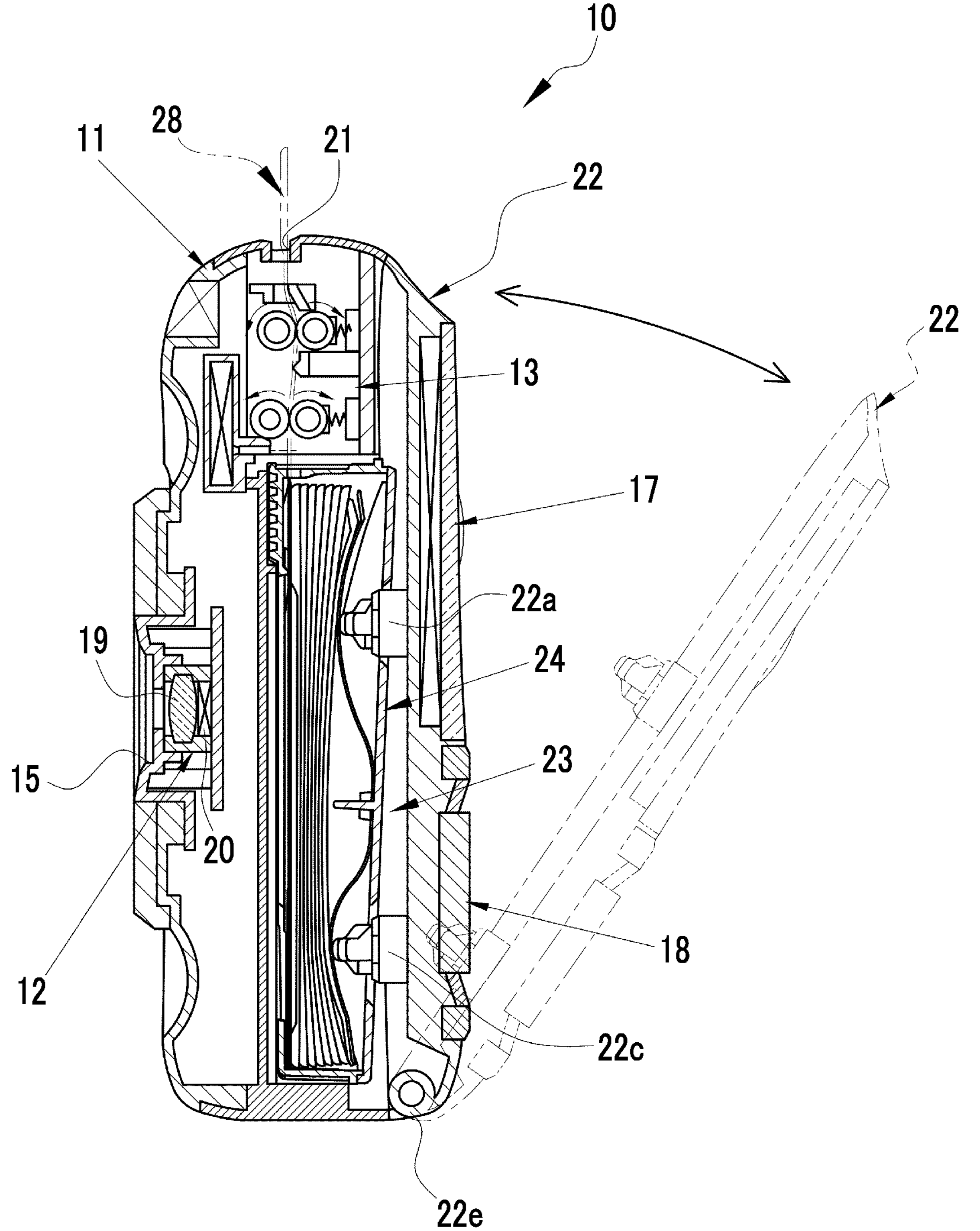
FIG. 2 is a longitudinal cross-sectional view of a center of the digital camera including a printer.

As shown in FIG. 2, the imaging optical system 19 and a solid-state imaging element 20 are provided in the imaging unit 12. For example, the solid-state imaging element 20 is a complementary metal-oxide-semiconductor (CMOS) image sensor, and includes a light receiving surface constituted by a plurality of pixels (not shown) arrayed in a two-dimensional matrix shape. Each pixel includes a photoelectric conversion element, photoelectrically converts a subject image formed on the light receiving surface by the imaging optical system 19, and generates an imaging signal.

The solid-state imaging element 20 comprises signal processing circuits (all not shown) such as a noise removal circuit, an auto gain controller, and an A/D conversion circuit. The noise removal circuit performs noise removal processing on the imaging signal. The auto gain controller amplifies a level of the imaging signal to an optimum value. The A/D conversion circuit converts the imaging signal into a digital signal, and outputs the digital signal to a built-in memory (not shown) from the solid-state imaging element 20. An output signal of the solid-state imaging element 20 is image data (so-called RAW data) having one color signal for each pixel.

The solid-state imaging element 20 is driven by pressing at least one of the release switch 16A or 16B, and the subject image is imaged.

A film feeding port 21 is provided on a top surface of the camera body 11. The instant film 28 on which an image has been printed is discharged from the film feeding port 21.

Figure 3:
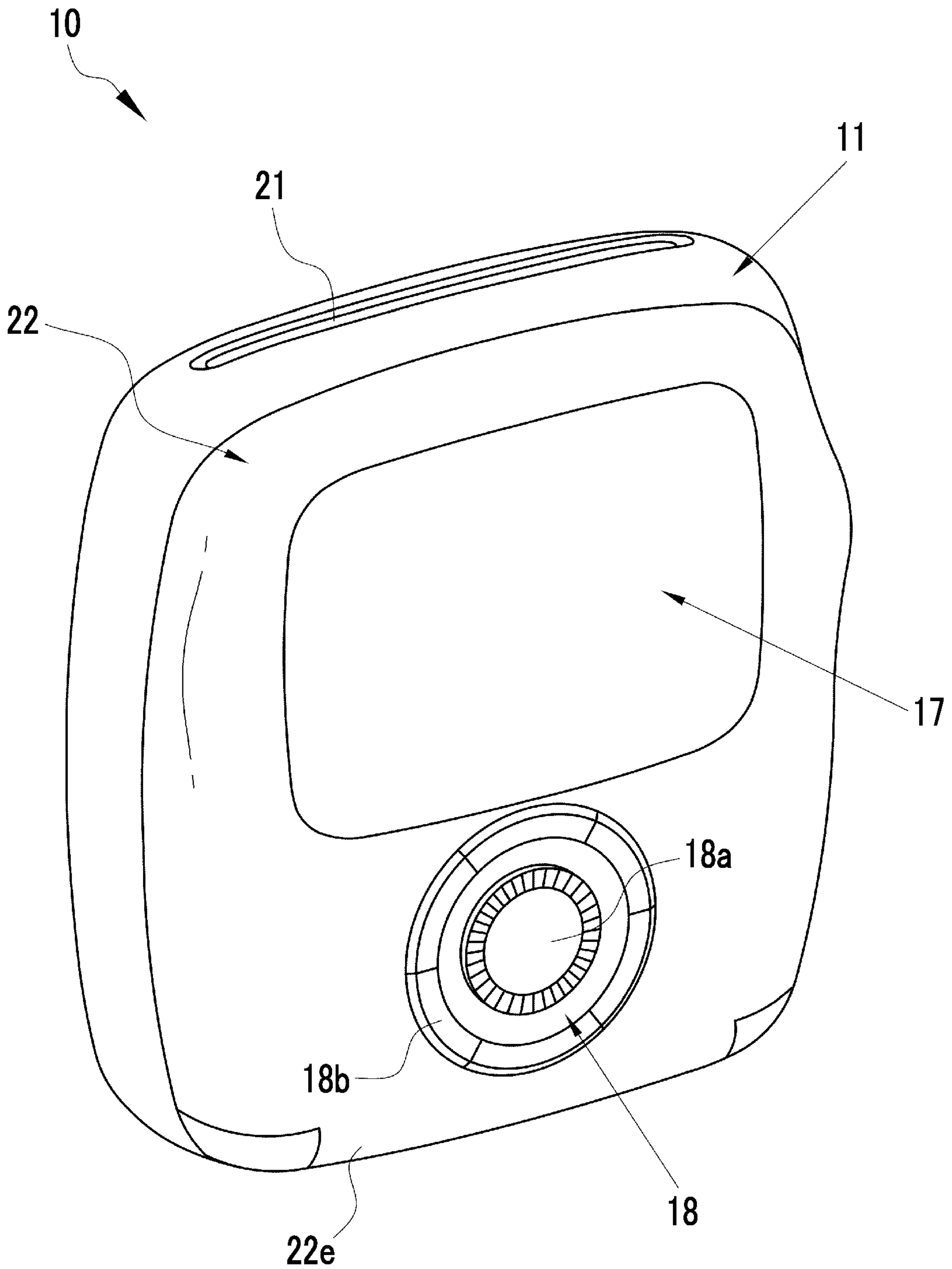
FIG. 3 is a rear perspective view of the digital camera including a printer with a loading lid in a closed position.

As shown in FIG. 3, a loading lid 22 is attached to a rear surface side of the camera body 11 through a hinge portion 22*e*. The hinge portion 22*e* rotatably supports the loading lid 22 between an opened position (state shown in FIG. 4) and a closed position (state shown in FIG. 3). A locking mechanism and an unlocking mechanism (all not shown) are provided between the camera body 11 and the loading lid 22, and in a case where the locking mechanism holds the loading lid 22 in the closed position and operates the unlocking mechanism, the loading lid 22 moves rotationally from the closed position to the opened position.

Figure 4:
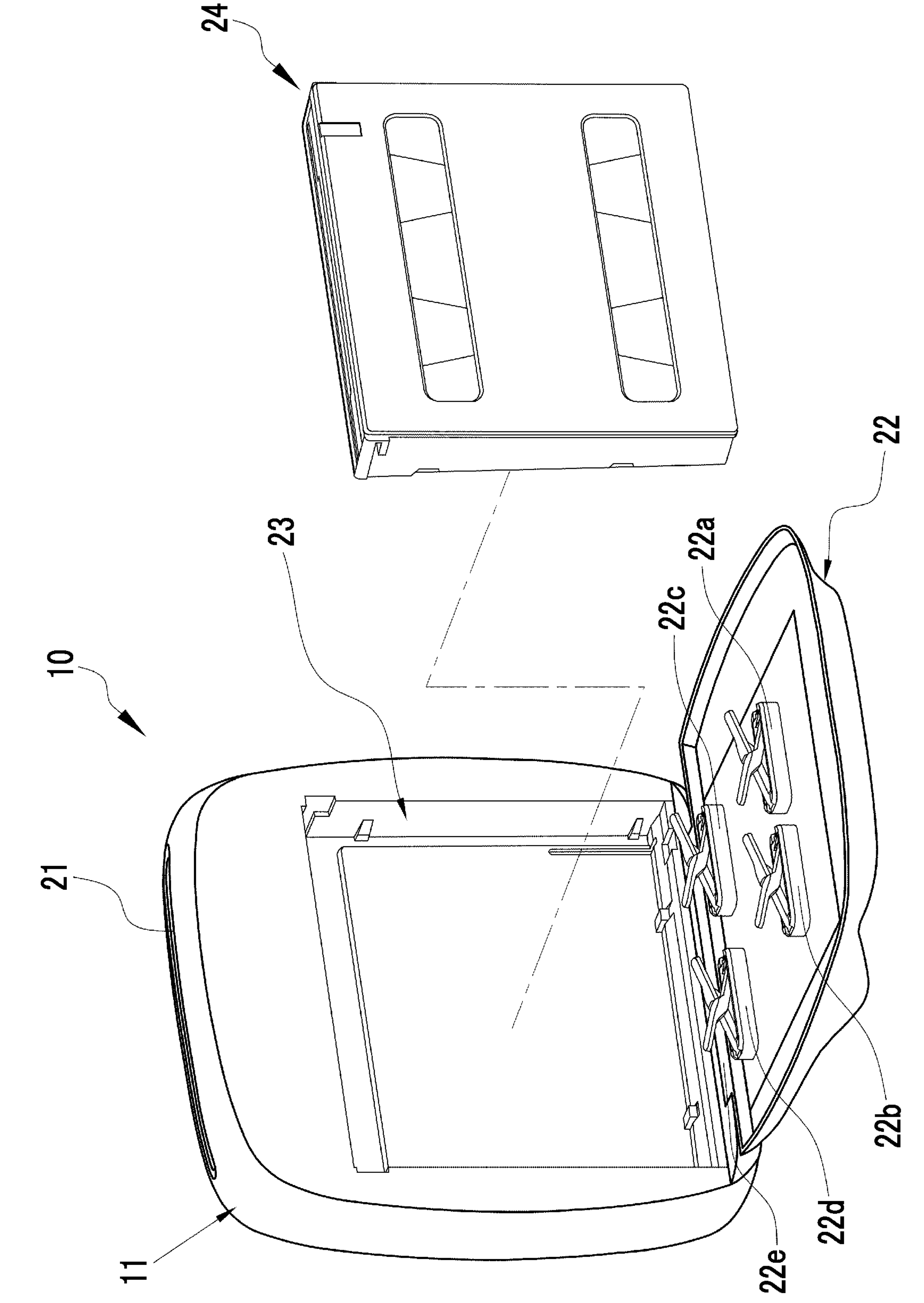
FIG. 4 is a rear perspective view of the digital camera including a printer with the loading lid in an opened position.

As shown in FIG. 4, an instant film pack 24 accommodating the instant film 28 is loaded into a film pack room 23 (loading room). A plurality of film holding portions 22*a* are provided on an inner surface of the loading lid 22.

A rear display unit 17 and an operating part 18 are provided on an outer surface of the loading lid 22, that is, a rear surface of the camera body 11. The rear display unit 17 is, for example, a liquid crystal display (LCD) panel. Image data items corresponding to one frame output from the solid-state imaging element 20 are sequentially input into the rear display unit 17, and are displayed as a live preview image.

A photographer presses at least one of the release switch 16A or 16B, and thus, imaging is started. Image data items are acquired from the solid-state imaging element 20 through the imaging. An image processing unit (not shown) performs known image processing on the image data items, and then the image data items are compressed. Examples of the image processing include matrix operation, demosaicing, γ correction, luminance conversion, color difference conversion, and resizing. The image data items on which the image processing and the compression are performed are recorded in a built-in memory (not shown) such as a flash memory provided within the camera body 11.

In a case where a menu switch 18*a* of the operating part 18 is pressed, the image is played and displayed on the rear display unit 17 based on the image data items recorded in the built-in memory. In a case where an image desired to be printed is displayed on the rear display unit 17, the photographer presses a print switch 18*b* of the operating part 18, and thus, printing processing by the printer unit 13 is started.

Configuration of Instant Film Pack

Figure 5:
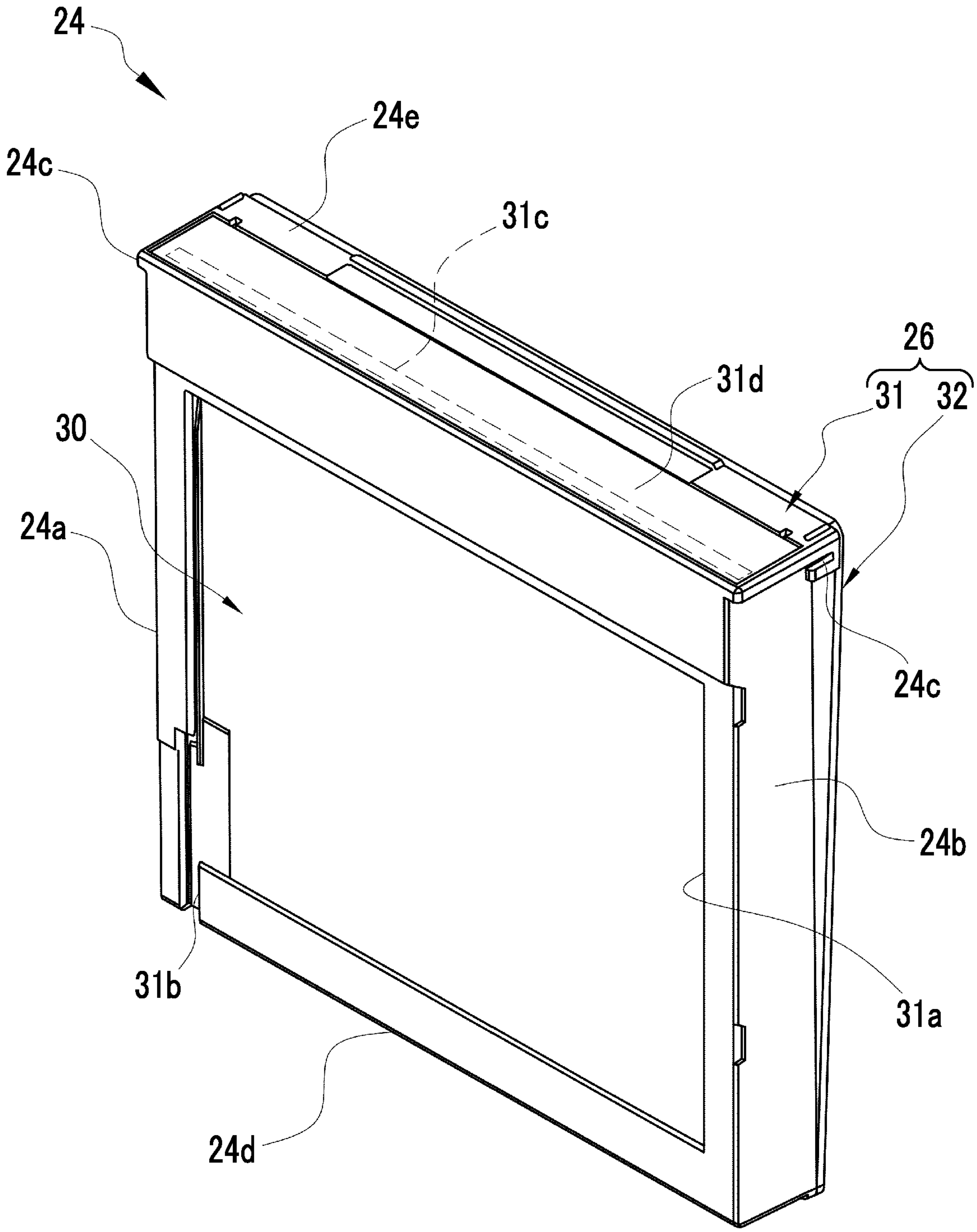
FIG. 5 is a perspective view of an instant film pack.
Figure 6:
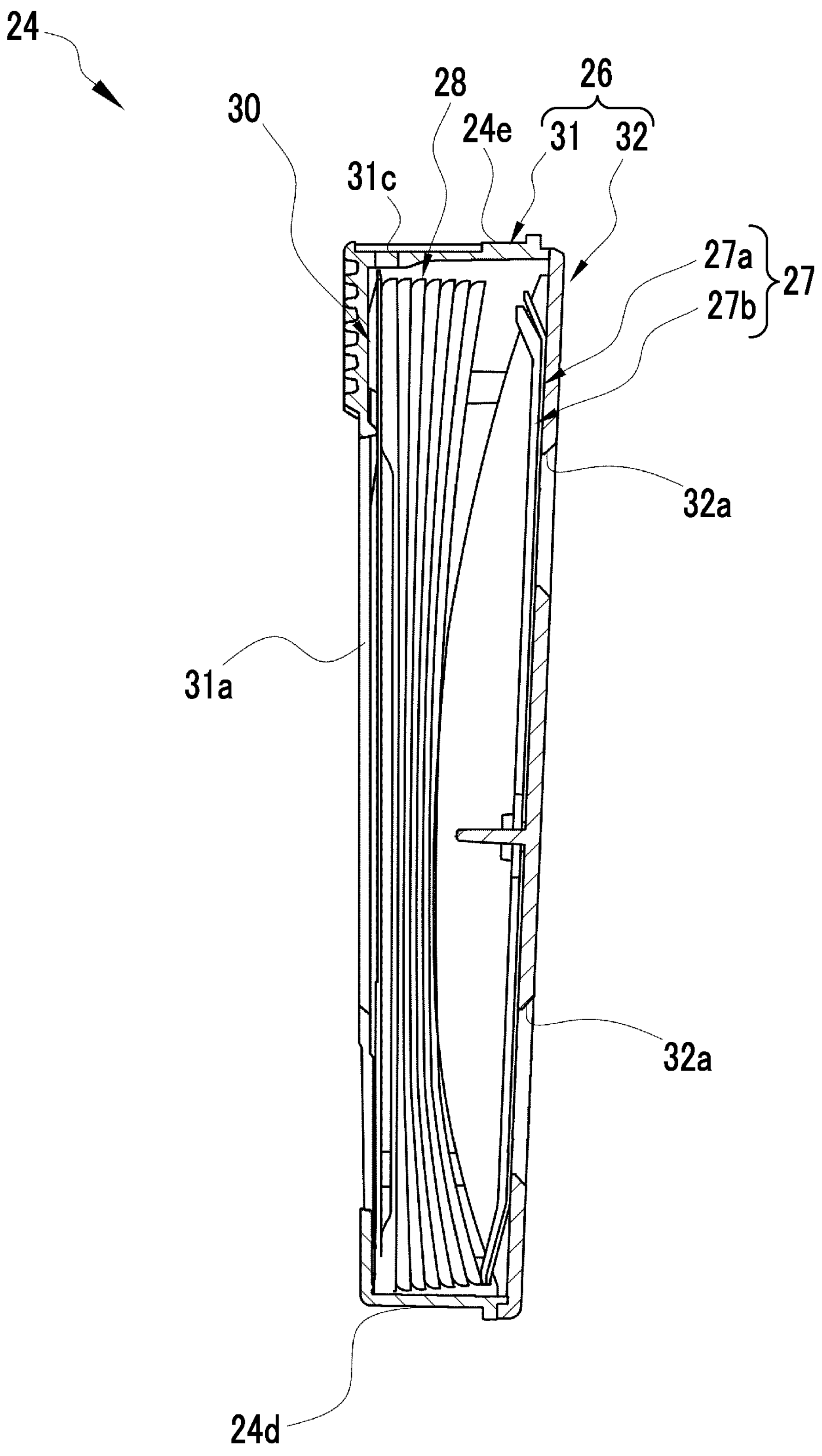
FIG. 6 is a cross-sectional view of the instant film pack.

As shown in FIGS. 5 and 6, the instant film pack 24 comprises a case 26, a film press plate 27, a plurality of instant films 28, and a film cover 30.

As shown in FIG. 6, the case 26 accommodates the plurality of instant films 28 and one film cover 30 in a stacking manner. The case 26 is made of a material such as a thermoplastic resin or a paper resin acquired by mixing the thermoplastic resin with cellulose. The case 26 includes a box-shaped case member 31, and a lid 32 that covers an opening formed in a rear surface side of the case member 31.

Figure 7:
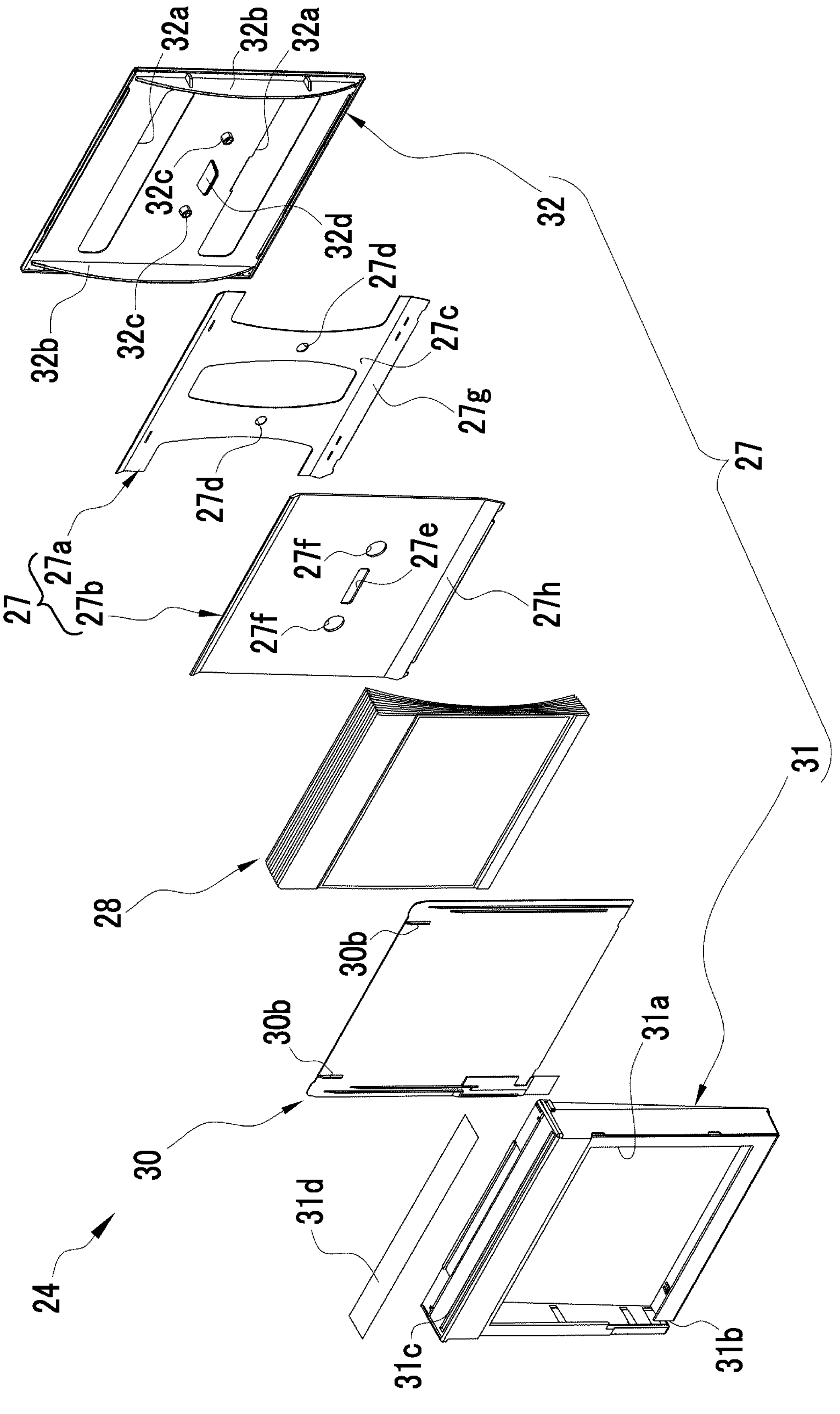
FIG. 7 is an exploded perspective view of the instant film pack.

As shown in FIG. 7, an exposure aperture 31*a* for exposing the instant film 28 is formed in the case member 31. In the following description, a surface of the instant film pack 24 in which the exposure aperture 31*a* is formed is a "front surface", a surface opposite to the "front surface" is a "rear surface", a surface facing the film feeding port 21 of the camera body 11 is a "top surface", and a surface opposite to the "top surface" is a "bottom surface". The film cover 30 is overlapped before the instant film 28 positioned in a foremost layer initially set in the exposure aperture 31*a* within the case member 31. Accordingly, the exposure aperture 31*a* is lighttightly blocked by the film cover 30. A cut-off portion 31*b* into which a known claw member 57 (see FIGS. 9 and 10) formed at the camera is inserted is formed in a lower portion of the exposure aperture 31*a*.

A feeding port 31*c* is formed on a top surface of the case member 31. The feeding port 31*c* is formed in a slit shape. The instant films 28 or the film cover 30 are fed one by one outwards from the instant film pack 24 by the claw member 57 inserted into the cut-off portion 31*b* of the case member 31 through the feeding port 31*c*.

A light shielding seal 31*d* is pasted onto the case member 31 so as to close the feeding port 31*c* from the outside. The light shielding seal 31*d* is formed as a flexible sheet. The light shielding seal 31*d* is pasted onto only one edge of a long side of the feeding port 31*c* so as not to hinder the instant film 28 or the film cover 30 when the instant film or the film cover passes through the discharge port 31*c*.

As shown in FIG. 7, the lid 32 includes a pair of openings 32*a*, a pair of unit support protrusions 32*b*, a pair of caulking pins 32*c*, and a support piece 32*d*. The pair of openings 32*a* are formed so as to be vertically spaced apart from each other by a predetermined interval, and serve as an entrance into which the film holding portions 22*a* provided in the digital camera 10 including a printer are inserted when the digital camera 10 including a printer is loaded.

The pair of unit support protrusions 32*b* are provided at both side edge portions of the lid 32 so as to be vertically long, and each has an arc shape of which a center portion protrudes toward the exposure aperture 31*a*. The unit support protrusions 32*b* touch both side edge portions on a rear surface of the instant film 28 positioned in a last layer, and push up the instant film 28 by each having the arc shape of which the center portion protrudes toward the exposure aperture 31*a*. Accordingly, a gap between the film cover 30 and the exposure aperture 31*a* is prevented from being formed.

The pair of caulking pins 32*c* are used for attaching the film press plate 27. The support piece 32*d* supports a center portion of the instant film 28 positioned in the last layer from behind, and prevents the instant film 28 from being curved in a direction in which the center portion is curved toward the lid 32.

The film press plate 27 includes two elastic sheets 27*a* and 27*b* made of a synthetic resin. The sheet 27*a* is pressed by the plurality of film holding portions 22*a* when the loading lid 22 is closed, and is curved so as to protrude toward the lid 32. An opening 27*c* and a pair of holes 27*d* are formed in the sheet 27*a*. The opening 27*c* is formed in a center portion of the sheet 27*a* so as to be vertically long, and the support piece 32*d* is inserted into this opening. The pair of caulking pins 32*c* are inserted into the pair of holes 27*d*, and the pair of holes are used for attaching the film press plate 27 to the lid 32.

An opening 27*e* and a pair of holes 27*f* are formed in the sheet 27*b*. The opening 27*e* is formed in a center portion of the sheet 27*a*, and the support piece 32*d* is inserted into this opening. The pair of caulking pins 32*c* are inserted into the pair of holes 27*f*. A lower end portion 27*h* of the sheet 27*b* is attached to a lower end portion 27*g* of the sheet 27*a*. Accordingly, the sheet 27*b* prevents the sheet 27*a* from being slack, and prevents light leak from the pair of openings 32*a*. The sheet 27*b* pushes up the instant film 28 in a substantially planar manner when the sheet 27*a* is elastically bent by the plurality of film holding portions 22*a*. As a result, the film cover 30 positioned in the foremost layer or the instant film 28 is pressed to the back side of the front surface of the case member 31.

L-shaped protrusions 24*c* are provided on both side surfaces 24*a* and 24*b* of the instant film pack 24. The protrusions 24*c* are protrusions provided to prevent the instant film pack 24 from being reversely loaded.

Configuration of Instant Film

Figure 8:
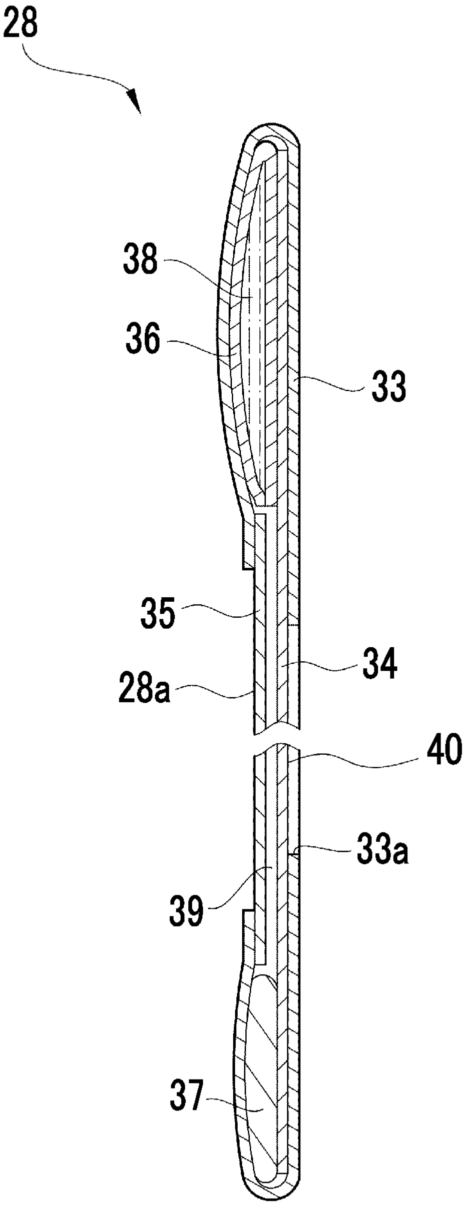
FIG. 8 is a cross-sectional view of the instant film.

As shown in FIG. 8, the instant film 28 includes a mask sheet 33, a photosensitive sheet 34, a cover sheet 35, a developer pod 36, and a trap portion 37, and is a so-called mono-sheet type film. The mask sheet 33 is formed as a sheet made of a thin synthetic resin, and comprises a screen opening 33*a*. A photosensitive layer, a diffusion reflective layer, an image receiving layer, and the like are provided in the photosensitive sheet 34. The cover sheet 35 includes an exposure surface 28*a* facing an exposure head 50 to be described below.

The developer pod 36 is formed in a substantially bag shape, and contains a developer 38 therein. The developer pod 36 is pasted onto an end portion of the photosensitive sheet 34 close to the feeding port 31*c*, and is wrapped by an end portion of the mask sheet 33. The trap portion 37 is pasted onto an end portion of the photosensitive sheet 34 opposite to the feeding port 31*c*, and is similarly wrapped by the end portion of the mask sheet 33.

The photosensitive layer of the instant film 28 is irradiated with print light at the time of printing, and thus, the photosensitive layer is exposed. The developer pod 36 is torn at the time of development, and the developer 38 flows and is spread into a gap 39 between the photosensitive sheet 34 and the cover sheet 35. An image acquired through the exposure of the photosensitive layer is reversed by the diffusion reflective layer, and is transferred to the image receiving layer. By doing this, a positive image appears on a positive image observation surface 40 of the photosensitive sheet 34 exposed through the screen opening 33*a*.

The film cover 30 is formed as a sheet thinner than the instant film 28, and has light shielding properties and flexibility. The film cover 30 is a molded item made of a synthetic resin, and is made, for example, of polystyrene containing carbon black. That is, the film cover 30 has rigidity higher than the instant film 28. In a case where the instant film pack 24 is loaded into the film pack room 23 and is used, the film cover 30 is discharged to the film discharge port 21 by a spreading roller pair 54 (see FIGS. 9 and 10) to be described later.

Configuration of Printer Unit

Figure 9:
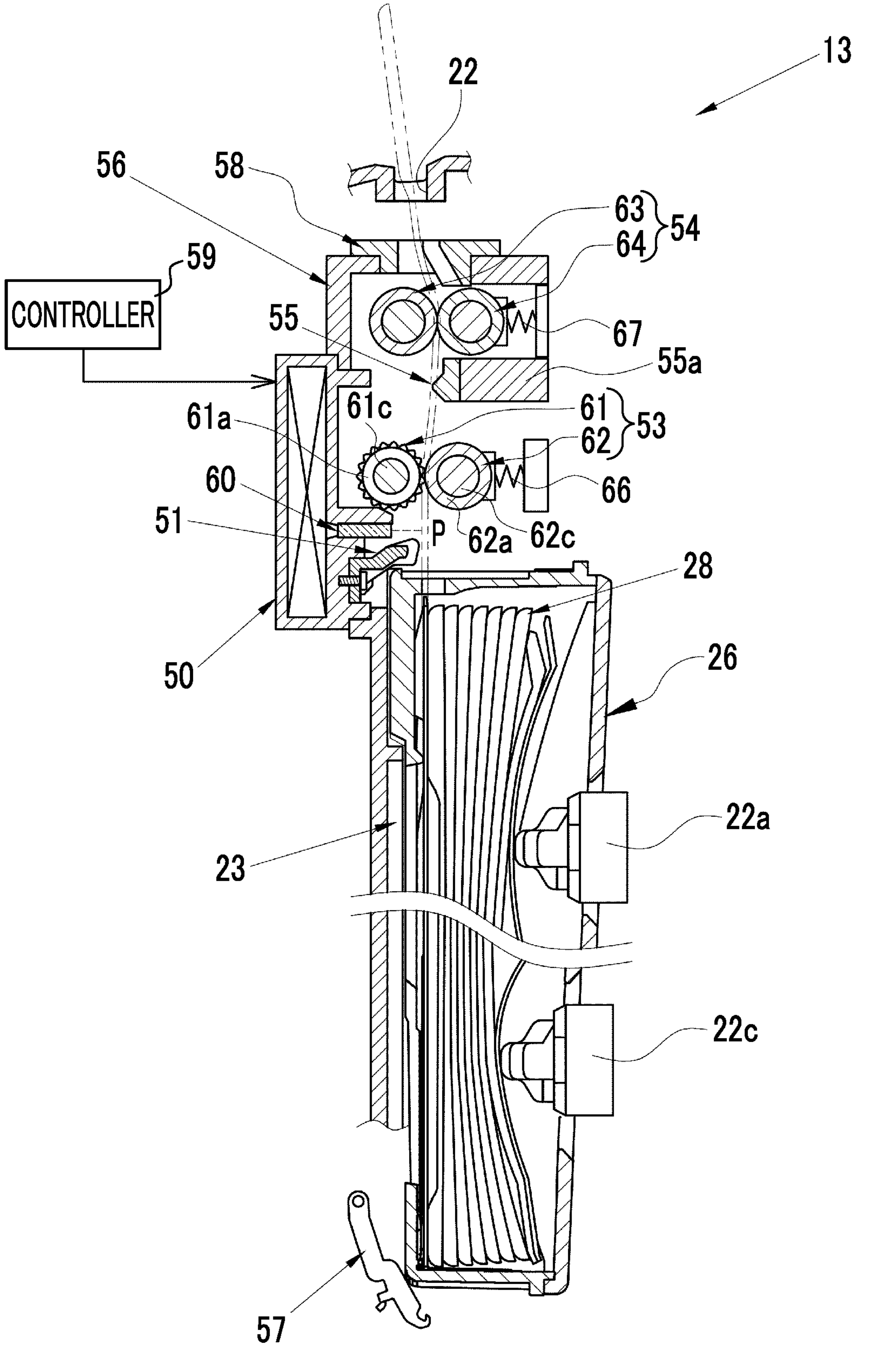
FIG. 9 is a cross-sectional view of a printer unit.
Figure 10:
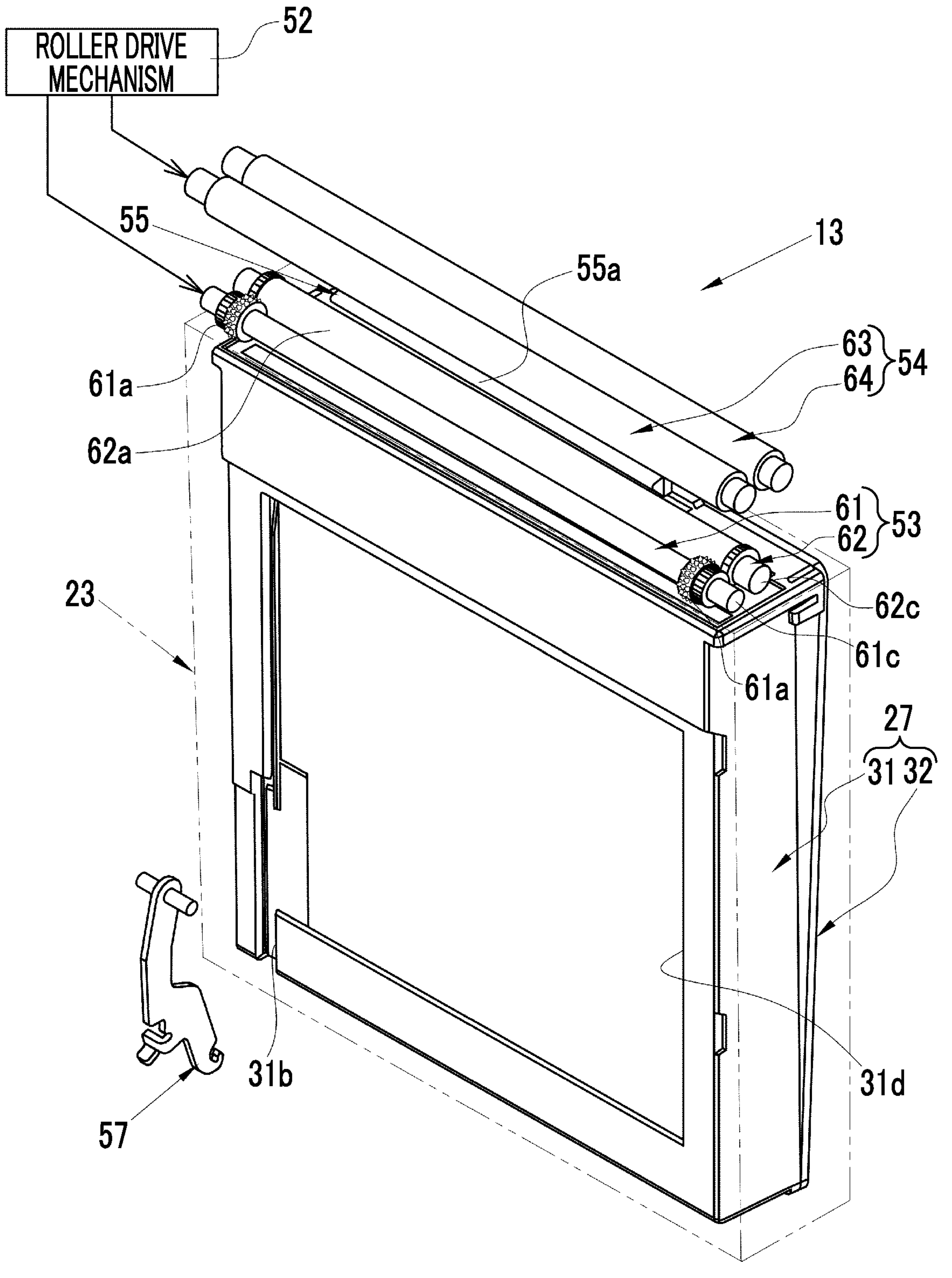
FIG. 10 is a perspective view of the printer unit in which a device housing is omitted.

As shown in FIGS. 9 and 10, the printer unit 13 includes the exposure head 50, a film support member 51, a roller drive mechanism 52, a transport roller pair 53, the spreading roller pair 54, a spreading control member 55, a device housing 56 (see FIG. 11), the claw member 57, a claw member drive mechanism (not shown), a discharge guide 58, and a controller 59.

Figure 11:
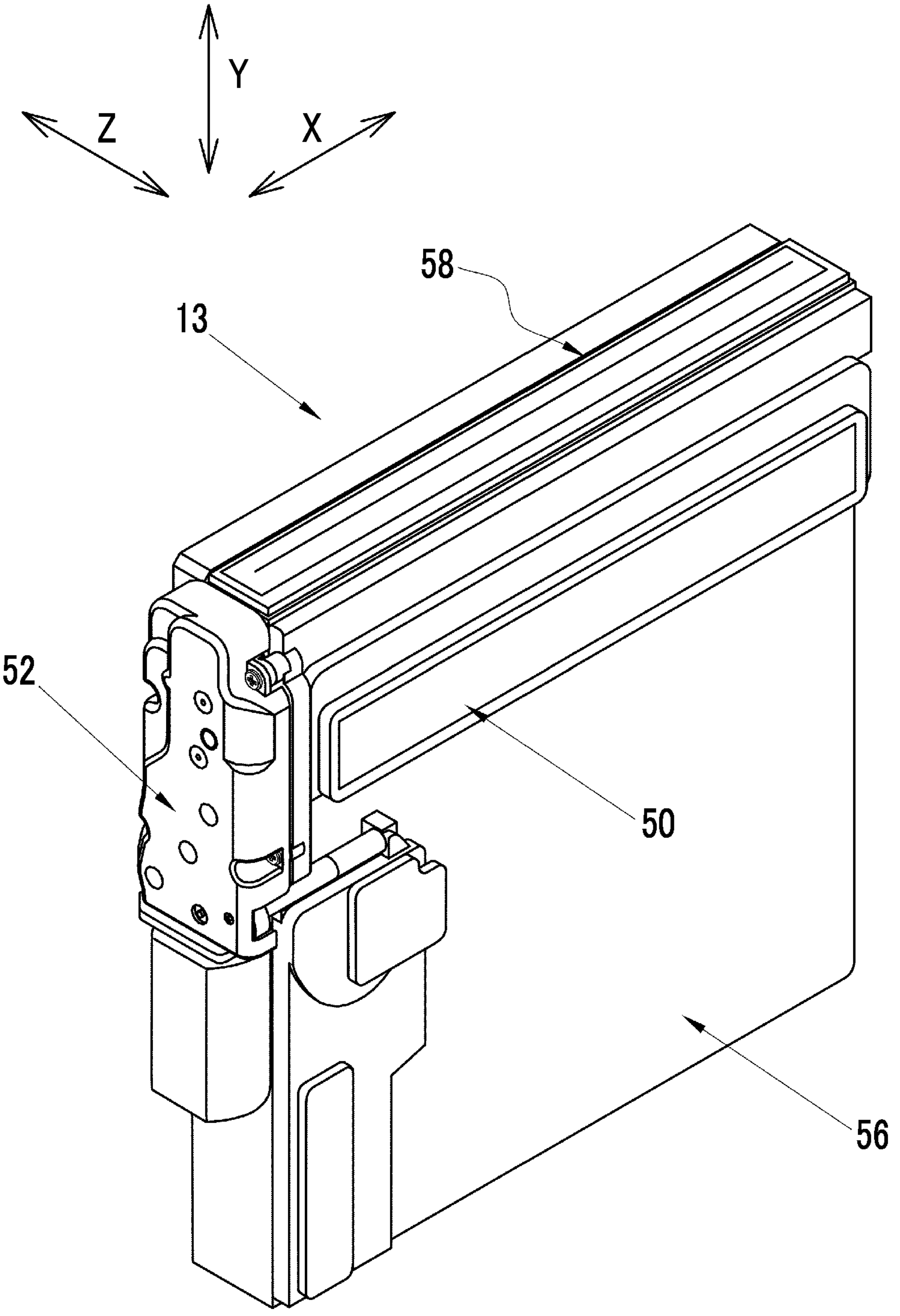
FIG. 11 is a perspective view of the printer unit.

In FIG. 10, although the device housing 56 and the like are omitted in order to avoid complication, in reality, the printer unit 13 is constituted by attaching the exposure head 50, the roller drive mechanism 52, the transport roller pair 53, the spreading roller pair 54, the spreading control member 55, the claw member 57, the claw member drive mechanism, and the like to the device housing 56 as shown in FIG. 11.

Hereinafter, a transport direction in which the transport roller pair 53 transports the instant film 28 is a Y direction, a width direction of the instant film 28 orthogonal to the Y direction is an X direction, and a direction orthogonal to the X direction and the Y direction is a Z direction.

Figure 12:
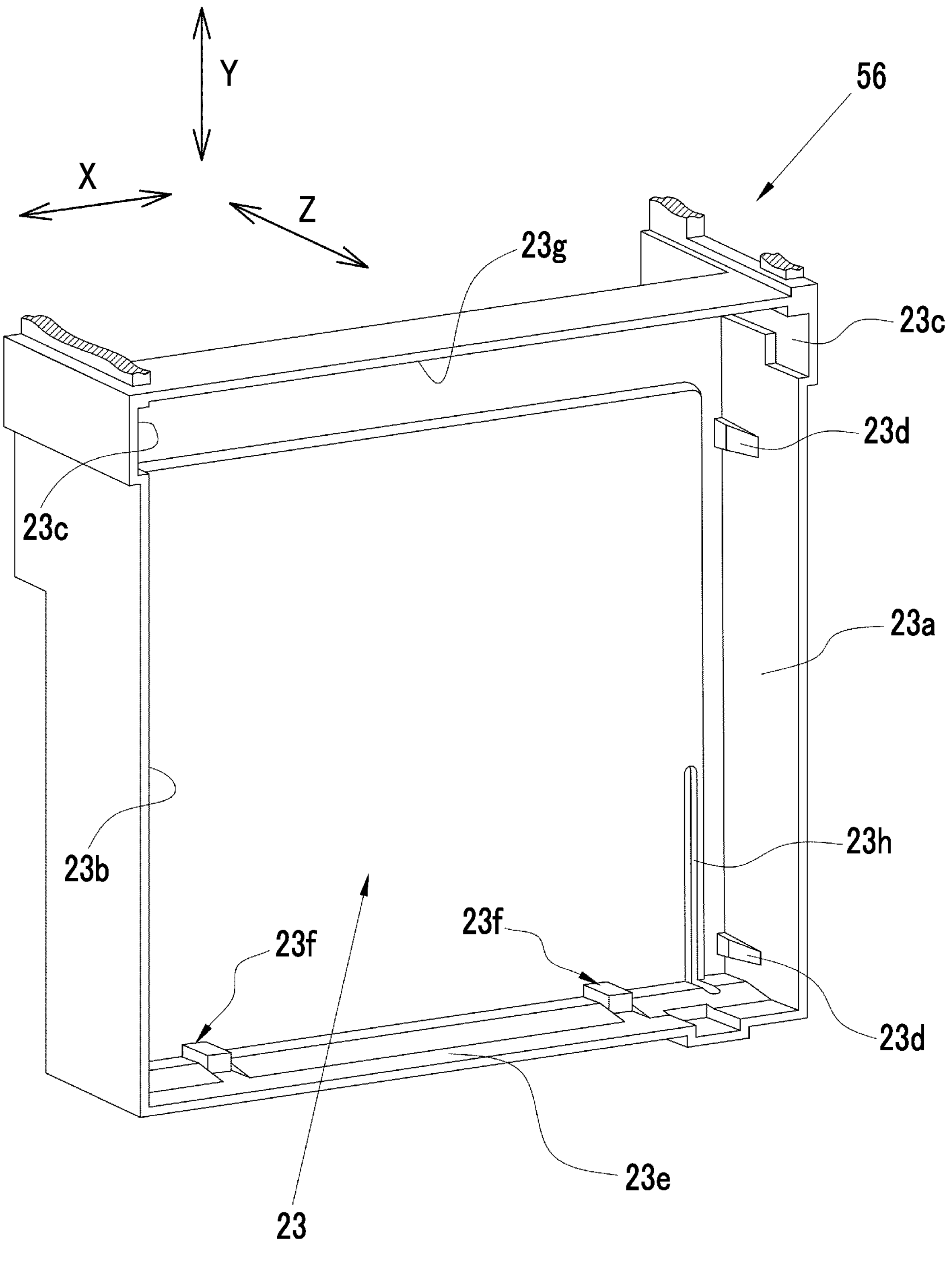
FIG. 12 is a perspective view of the device housing.

As shown in FIG. 12, the device housing 56 is formed in a box shape in which the rear surface side of the camera body 11 is opened, and the film pack room 23 is integrally provided. In addition to the film pack room 23, the device housing 56 has a frame portion that supports the exposure head 50, the roller drive mechanism 52, the transport roller pair 53, the spreading roller pair 54, the claw member 57, and the like, but these components are omitted in FIG. 12. The device housing 56 is made of a resin material.

L-shaped cut-off portions 23*c* are formed on both side surfaces 23*a* and 23*b* of the film pack room 23. The L-shaped cut-off portions 23*c* prevent the instant film pack 24 from being reversely loaded by being fitted with the L-shaped protrusions 24*c* provided on both the side surfaces 24*a* and 24*b* of the instant film pack 24.

Positioning protrusions 23*d* for positioning the instant film pack 24 in the X direction are provided in the film pack room 23. The positioning protrusions 23*d* are formed in a wedge shape in which a thickness gradually increases in the Z direction, that is, in a front-rear direction of the camera body 11.

Elastic members 23*f* that perform positioning in the Y direction are provided on a bottom surface 23*e* of the film pack room 23. The elastic member 23*f* is a cuboid member made of sponge or rubber. An elastic force in a case where the elastic members 23*f* try to return from a compressed state to an uncompressed state acts, and a top surface 24*e* of the instant film pack 24 is pressed against a top surface 23*g* of the film pack room 23. The top surface 23*g* of the film pack room 23 has an opening portion connected to the transport roller pair 53.

The film pack room 23 comprises a cut-off portion 23*h*. The claw member 57 enters the inside of the instant film pack 24 through the cut-off portion 23*h*, and the instant films 28 are fed one by one outwards from the instant film pack 24.

As described above, the instant film pack 24 is loaded into the film pack room 23. An image is recorded on the instant film 28 discharged from the instant film pack 24 by the printer unit 13.

As shown in FIG. 9, the device housing 56 includes the transport roller pair 53 and the spreading roller pair 54. Specifically, a bearing unit (not shown) that pivotally supports the transport roller pair 53 and the spreading roller pair 54 is provided in the device housing 56.

Configuration of Transport Roller Pair and Spreading Roller pair

Figure 13:
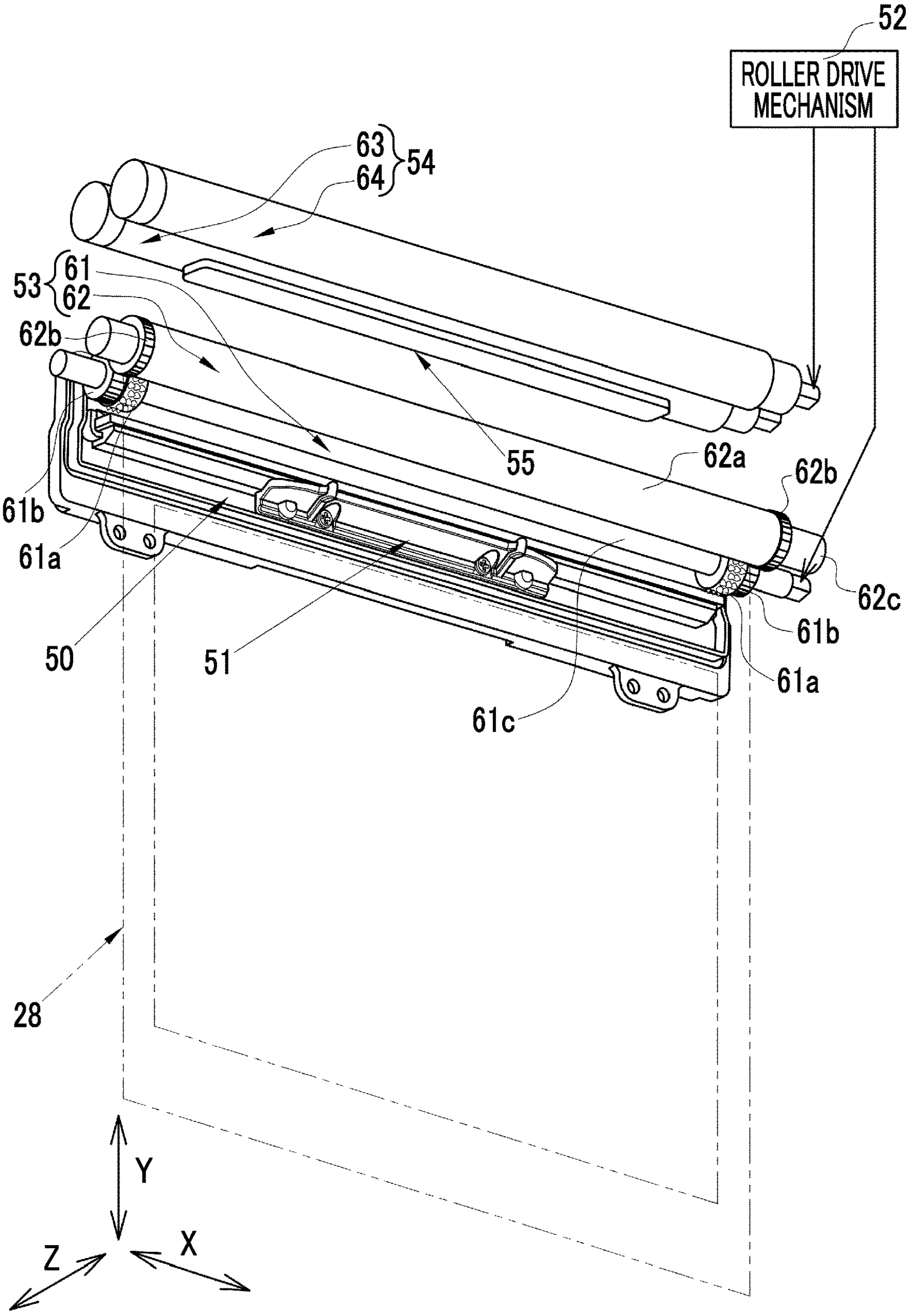
FIG. 13 is a perspective view of an edge part of an exposure head and a support member.

As shown in FIG. 13, the transport roller pair 53 and the spreading roller pair 54 are driven to be rotated by the roller drive mechanism 52, and transport the film cover 30 and the instant film 28. The roller drive mechanism 52 comprises, for example, a motor as a drive source and a drive transmission gear train that transmits a rotational driving force.

The transport roller pair 53 includes a capstan roller 61 and a pinch roller 62. The capstan roller 61 and the pinch roller 62 are disposed at positions at which these rollers pinch a transport passage of the instant film 28 (see FIG. 9). The capstan roller 61 is disposed on a side of the instant film 28 facing the exposure surface 28*a*. The capstan roller 61 includes a pair of columnar spike roller members 61*a*, a drive gear 61*b*, and a rotational shaft 61*c* that holds each spike roller member 61*a* and the drive gear 61*b*. A spike including a plurality of small protrusions is formed on a circumferential surface of the spike roller member 61*a*.

The pinch roller 62 is disposed on a side of the instant film 28 facing the positive image observation surface 40. The pinch roller 62 includes a roller member 62*a*, a drive gear 62*b*, and a rotational shaft 62*c*. Both end portions of the roller member 62*a* are supported so as to freely move by the device housing 56 within a thickness range of the instant film 28, and are pressed toward the capstan roller 61 by springs 66 as press mechanisms. Thus, the pinch roller 62 is elastically supported in a direction orthogonal to the transport direction of the instant film 28.

The drive gears 61*b* and 62*b* are provided at both end portions of the rotational shafts 61*c* and 62*c* and mesh with each other. A motor is connected to one end of the rotational shaft 61*c* via a drive transmission gear train. Thus, in a case where the motor rotates, the capstan roller 61 and the pinch roller 62 rotate in synchronization with each other. In the instant film 28 discharged from the instant film pack 24 can be transported to a further downstream side in the transport direction, that is, toward the spreading roller pair 54 while the spike roller member 61*a* reliably holds both side edge portions.

The spreading roller pair 54 includes spreading rollers 63 and 64, and is disposed on a downstream side of the transport roller pair 53 in the transport direction. The spreading roller 63 is disposed on a side of the instant film 28 facing the exposure surface 28*a*. The spreading roller 64 is disposed on a side of the instant film 28 facing the positive image observation surface 40. Both end portions of the spreading roller 64 are supported so as to freely move within the thickness range of the instant film 28 by the device housing 56, and are pressed toward the spreading roller 63 by springs 67 (see FIG. 9) as press mechanisms. Thus, the spreading roller 64 is elastically supported in a direction orthogonal to the transport direction of the instant film 28. A motor is connected to one end of the spreading roller 63 or 64 via a drive transmission gear train. Thus, in a case where a DC motor rotates, the spreading rollers 63 and 64 rotate in synchronization with each other.

The discharge guide 58 is disposed on the downstream side of the spreading roller pair 54 in the transport direction. The spreading roller pair 54 transports the instant film 28 transported by the transport roller pair 53 toward the discharge guide 58 in a state of pinching the instant film over the entire width. The instant film is sandwiched by the spreading roller pair 54, and thus, the developer pod 36 of the instant film 28 is crushed. Accordingly, the developer is spread (unfolded) into the gap 39 (see FIG. 8). The instant film 28 fed from the spreading roller pair 54 is transported toward the discharge guide 58.

The spreading control member 55 (see FIG. 9) is provided between the transport roller pair 53 and the spreading roller pair 54. The spreading control member 55 touches the positive image observation surface 40 of the transported instant film 28, and rubs the positive image observation surface 40 of the instant film 28. Thus, the spreading control member 55 that controls a distribution of developer being spread extends in a direction parallel to the width direction of the instant film 28 being transported and orthogonal to the transport direction of the instant film 28. The spreading control member 55 is formed integrally with a plate-shaped support member 55*a*, and is fixed to the device housing 56 via the support member 55*a*.

A distal end of the spreading control member 55 protrudes toward the instant film 28 from a sandwiching position at which the spreading roller pair 54 sandwiches the instant film 28 on a cross section which is orthogonal to the exposure surface 28*a* of the instant film 28 being transported and is in parallel with the transport direction. Accordingly, the spreading control member 55 can securely rub the positive image observation surface 40 of the instant film 28.

The transport roller pair 53 transports the instant film 28 fed from the instant film pack 24 by the claw member 57 toward the film discharge port 21. An exposure position P (see FIG. 9) at which the exposure head 50 exposes the instant film 28 to the print light is positioned between the feeding ports 31*c* of the instant film pack 24 and the transport roller pair 53. That is, the transport roller pair 53 is disposed on the downstream side (the film discharge port 21 side) in the transport direction of the instant film 28 with respect to the exposure head 50. The exposure using the exposure head 50 is performed for a period during which the instant film is transported by the transport roller pair 53.

A lens 60 constituting the exposure head 50 requires a focal length of a predetermined value or longer. For example, a SELFOCK lens (registered trademark) is used as the lens 60 (see FIG. 16).

The controller 59 controls the exposure of the exposure head 50 based on the image data. The exposure by the exposure head 50 is performed by sequentially exposing line images on the instant film 28 while moving the instant film 28 for each line. Accordingly, an image corresponding to a single screen is exposed on the photosensitive layer of the instant film 28. The instant film 28 is subsequently transported toward the spreading roller pair 54 by the transport roller pair 53.

Configuration of Support Member

As shown in FIG. 13, the film support member 51 protrudes from the exposure head 50 toward the instant film 28 and is formed in a plate shape extending in the X direction (width direction). The film support member 51 is fixed to the exposure head 50.

Figure 14:
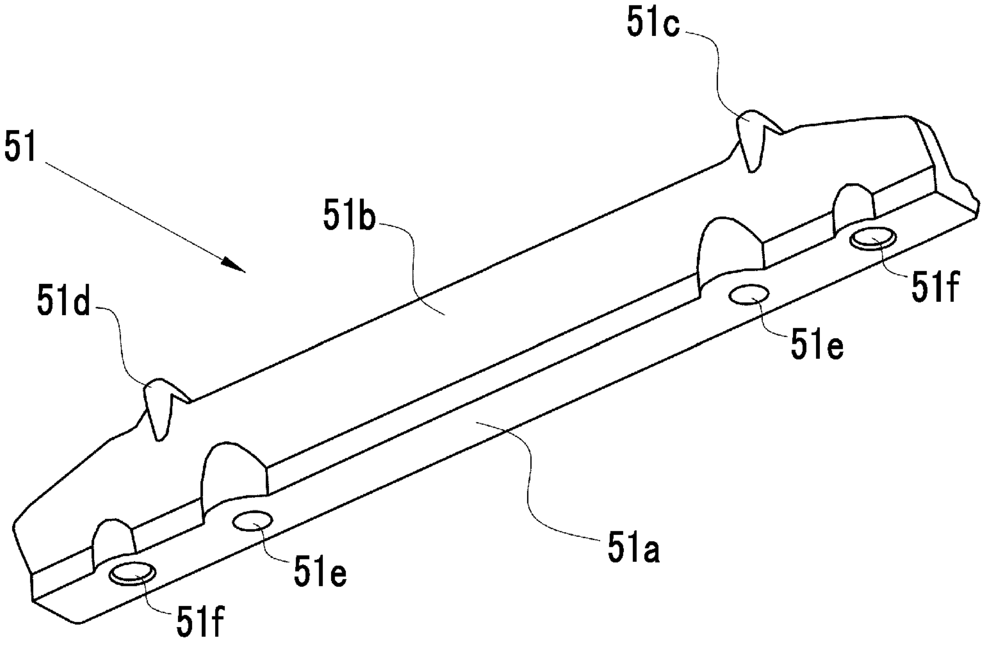
FIG. 14 is a perspective view of the support member.

As shown in FIG. 14, in the film support member 51, a fixed piece 51*a* fixed to the exposure head 50, a protrusion piece 51*b*, and two support ribs 51*c* and 51*d* are integrally formed. The fixed piece 51*a* includes a fixing hole 51*e* and a positioning recess 51*f*. The protrusion piece 51*b* protrudes from the fixed piece 51*a* toward the instant film 28, and forms a substantially L-shaped cross section together with the fixed piece 51*a*.

Figure 15:
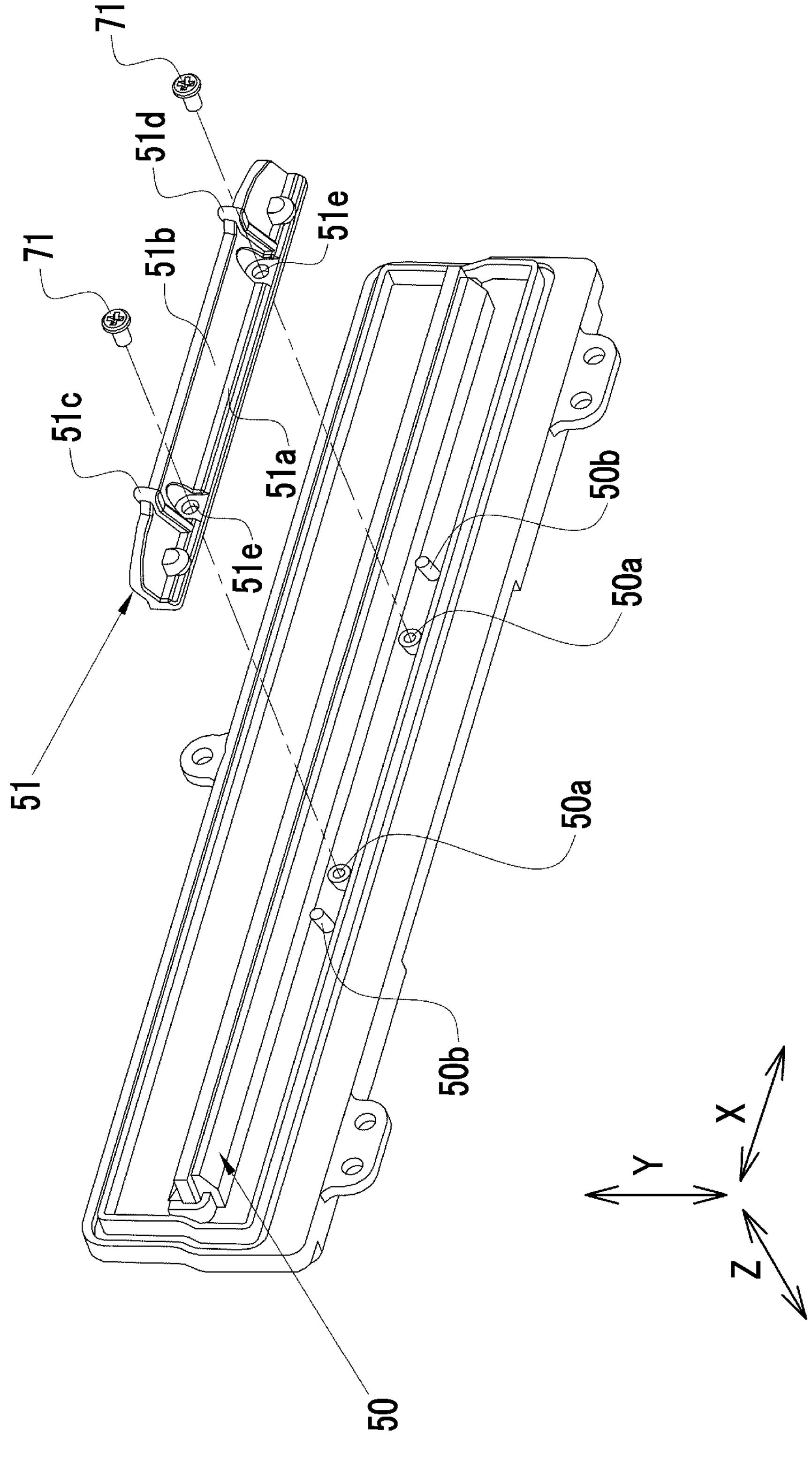
FIG. 15 is a perspective view of the exposure head and the support member.

As shown in FIG. 15, the exposure head 50 has a female screw hole 50*a* and a positioning protrusion 50*b*. The positioning recess 51*f* of the film support member 51 fits into the positioning protrusion 50*b* of the exposure head 50. Accordingly, the film support member 51 is positioned with respect to the exposure head 50. On the other hand, in the film support member 51, a male screw 71 is attached to the fixing hole 51*e*. The male screw 71 is fastened and fixed to the female screw hole 50*a* of the exposure head 50. Accordingly, the film support member 51 is fixed to the exposure head 50.

The support ribs 51*c* and 51*d* protrude from the protrusion piece 51*b* toward the instant film 28 and are provided at intervals in the X direction. In the present embodiment, two support ribs 51*c* and 51*d* are provided in the X direction, but the present invention is not limited thereto, and three or more support ribs may be provided.

Figure 16:
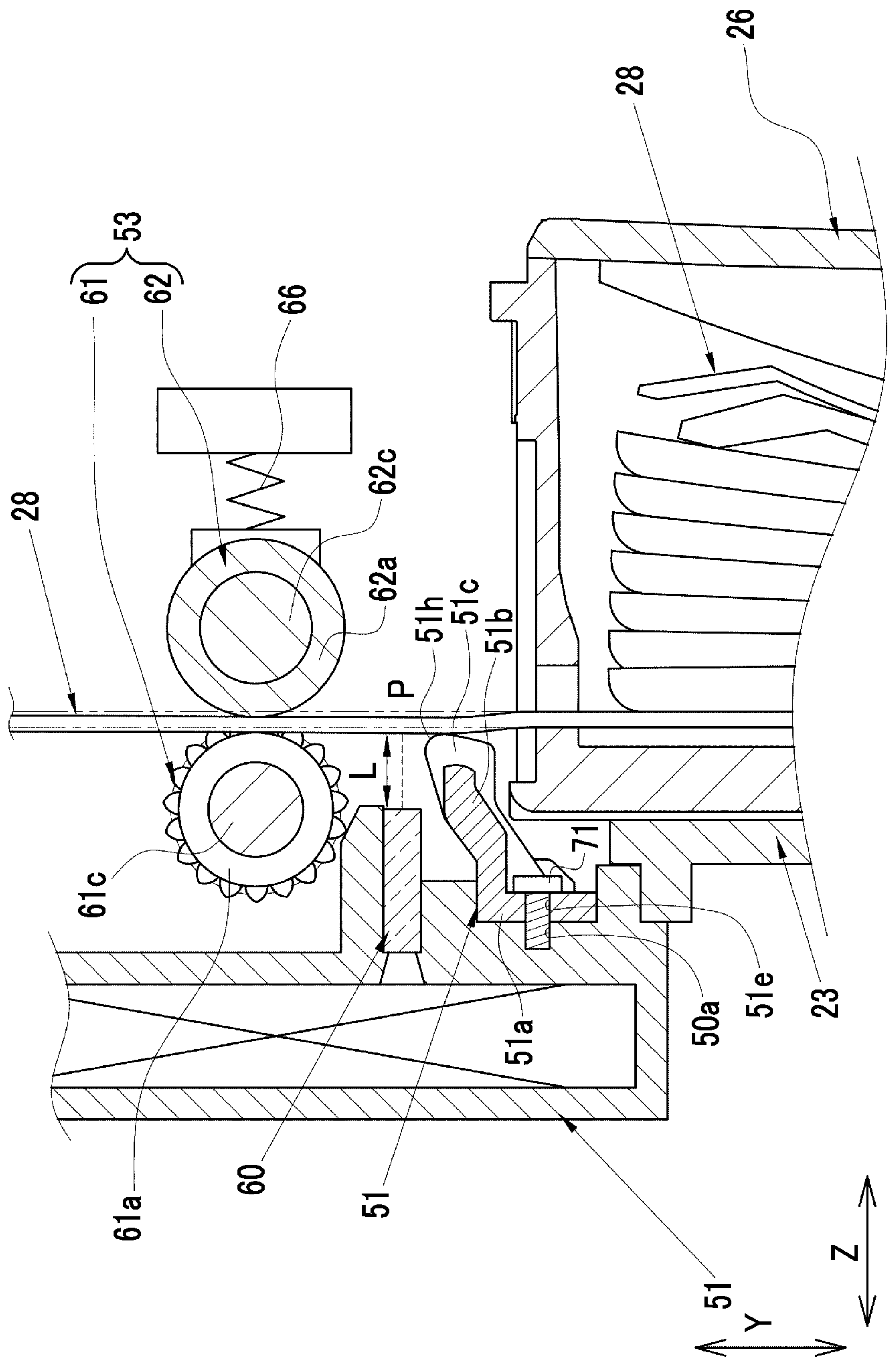
FIG. 16 is a cross-sectional view of a main part of an edge part of the support member.

As shown in FIG. 16, the support ribs 51*c* and 51*d* are provided between the film pack room 23 and the exposure head 50 in the Y direction, and the instant film 28 supports the instant film 28 from a side facing the exposure head 50. The space between the film pack room 23 and the exposure head 50 as used herein means specifically a space between the film pack room 23 and the lens 60 of the exposure head 50.

Each of the support ribs 51*c* and 51*d* has a sliding surface 51*h* at a distal end close to the instant film 28. Although only the support rib 51*c* and the sliding surface 51*h* of the support rib 51*c* are shown in FIG. 16, the support rib 51*d* also has a sliding surface 51*h* having the same shape. The sliding surface 51*h* is formed in a curved shape. Specifically, the sliding surface 51*h* includes an arcuate curved surface having a central axis parallel to the X direction, and has a shape in which all corner portions are rounded.

The support ribs 51*c* and 51*d* are disposed at positions spaced from an orbit (position indicated by a dashed double-dotted line) of the instant film 28. The orbit of the instant film 28 as used herein refers to an orbit in a case where the instant film 28 is transported while maintaining a planar state without being curved. A position (position indicated by a solid line) through which the instant film 28 actually passes is spaced from an orbit (position indicated by a dashed double-dotted line). Thus, the support ribs 51*c* and 51*d* are disposed at positions where the support ribs slide in a case where the instant film 28 is curved.

As described above, the lens 60 constituting the exposure head 50 may require a focal length of a certain value or longer, and it is necessary to provide an interval of a dimension L from a front surface of the lens 60 to the instant film 28. The dimension L is, for example, more than or equal to 2.8 mm. Accordingly, the instant film 28 cannot be supported by the lens 60 that constitutes the exposure head 50. Therefore, the printer unit 13 comprises the support ribs 51*c* and 51*d* that support the instant film 28.

Configuration of Film Holding Portion

Figure 17:
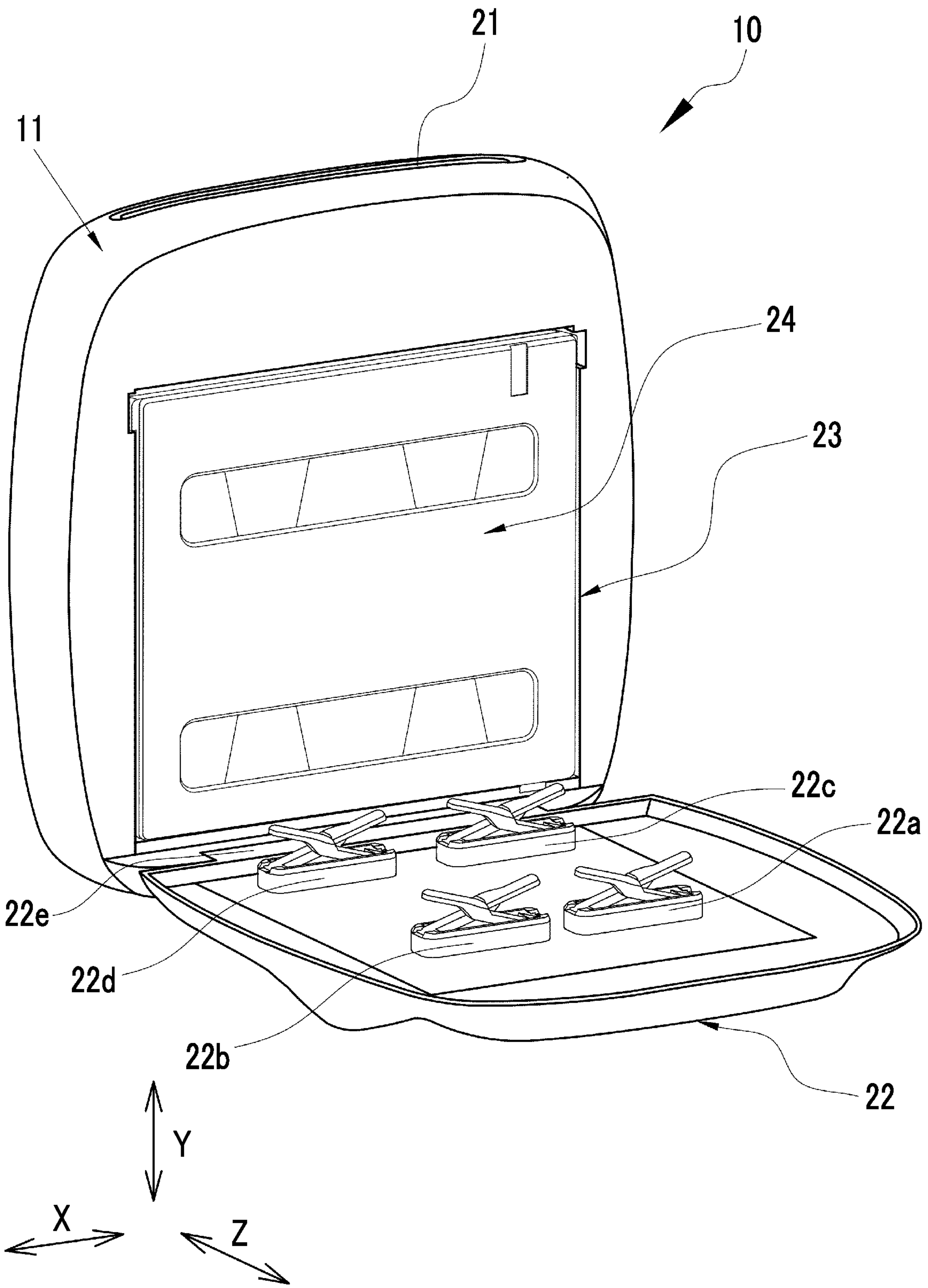
FIG. 17 is a rear perspective view of the digital camera including a printer in which the loading lid is in the opened position and the instant film pack is loaded.

As shown in FIG. 17, in a case where the loading lid 22 is in the opened position, the film pack room 23 is opened, and in a case where the loading lid 22 is in the closed position, the loading lid 22 covers the opened rear surface of the film pack room 23 (state shown in FIG. 3). The instant film pack 24 is positioned in the X direction and the Y direction with respect to the film pack room 23, and is further positioned in the Z direction by positioning the loading lid 22 in the closed position. Specifically, the plurality of film holding portions 22*a* to 22*d* provided at the loading lid 22 are positioned in the Z direction with respect to the instant film pack 24.

Figure 18:
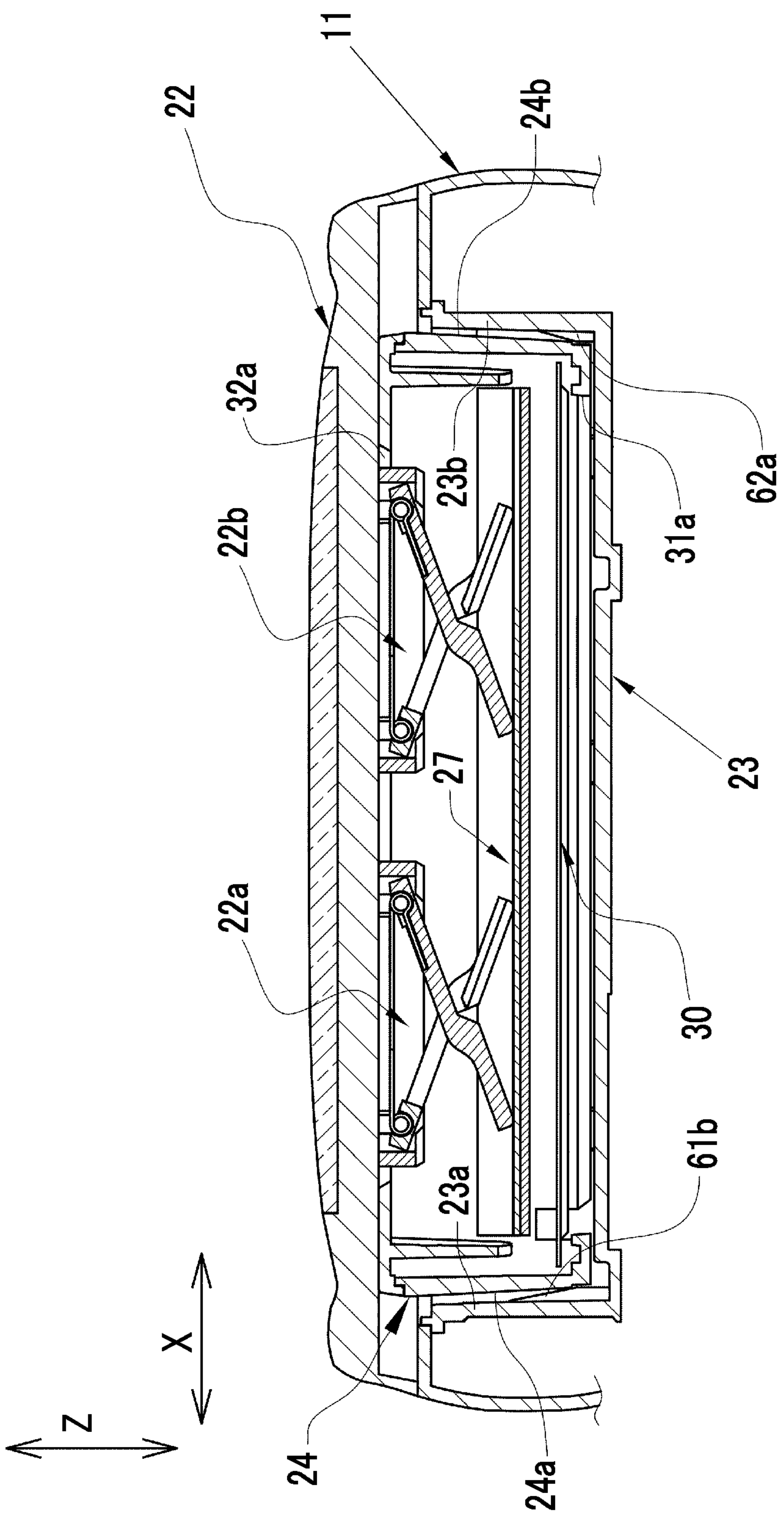
FIG. 18 is a traversal cross-sectional view of the digital camera including a printer into which the instant film pack is loaded.

As shown in FIG. 18, in a case where the instant film pack 24 is loaded into the film pack room 23 and the loading lid 22 is positioned in the closed position, the plurality of film holding portions 22*a* to 22*d* pass through the openings 32*a*, are inserted into the instant film pack 24, and press the film press plate 27. Accordingly, the instant films 28 in the instant film pack 24 are pressed in a stacking direction. In FIG. 18, although the instant film 28 is not shown in order to prevent complication, in reality, the instant films 28 are stacked between the film press plate 27 and the film cover 30.

Figure 19:
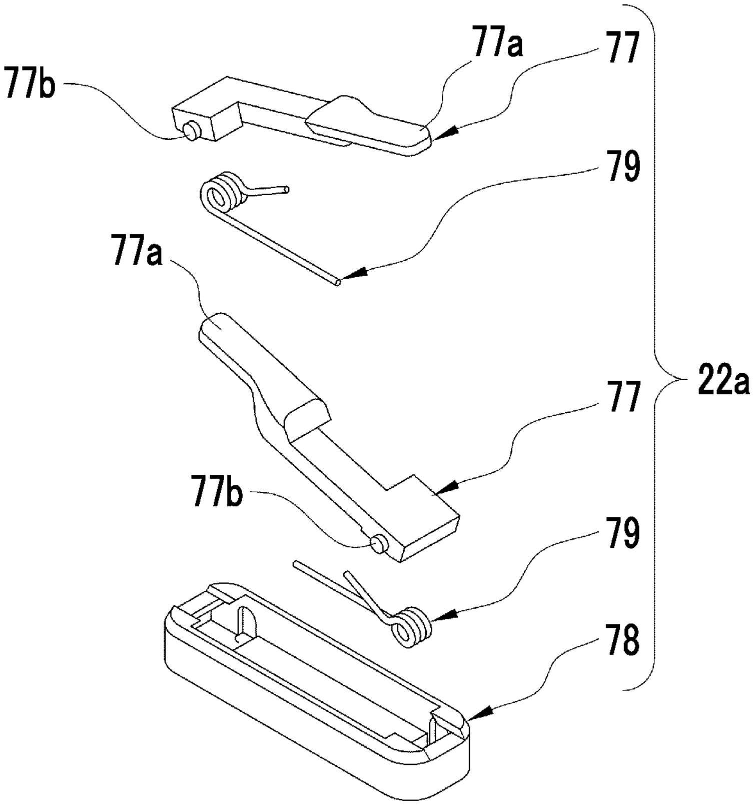
FIG. 19 is an exploded perspective view of film holding portions.

As shown in FIG. 19, the film holding portion 22*a* includes a pair of pressing members 77, a holding frame 78, and springs 79 (biasing members) (spring members). Since the film holding portions 22*b* to 22*d* have the same configuration as the film holding portions 22*a*, the description thereof will be omitted. The holding frame 78 holds the pressing members 77, and is fixed to an inner wall surface side of the loading lid 22.

The pair of pressing members 77 face each other such that positions of distal end portions 77*a* and rotational movement shafts 77*b* are opposite to each other, and are held by the holding frame 78. For example, the holding frame 78 is fixed to the loading lid 22 through screwing. The springs 79 are torsion coil springs, and are attached between the pressing members 77 and the holding frame 78. The springs 79 bias the pressing members 77 such that the distal end portions 77*a* move rotationally upward in the drawing. Accordingly, the distal end portions 77*a* press the film press plate 27.

Figure 20:
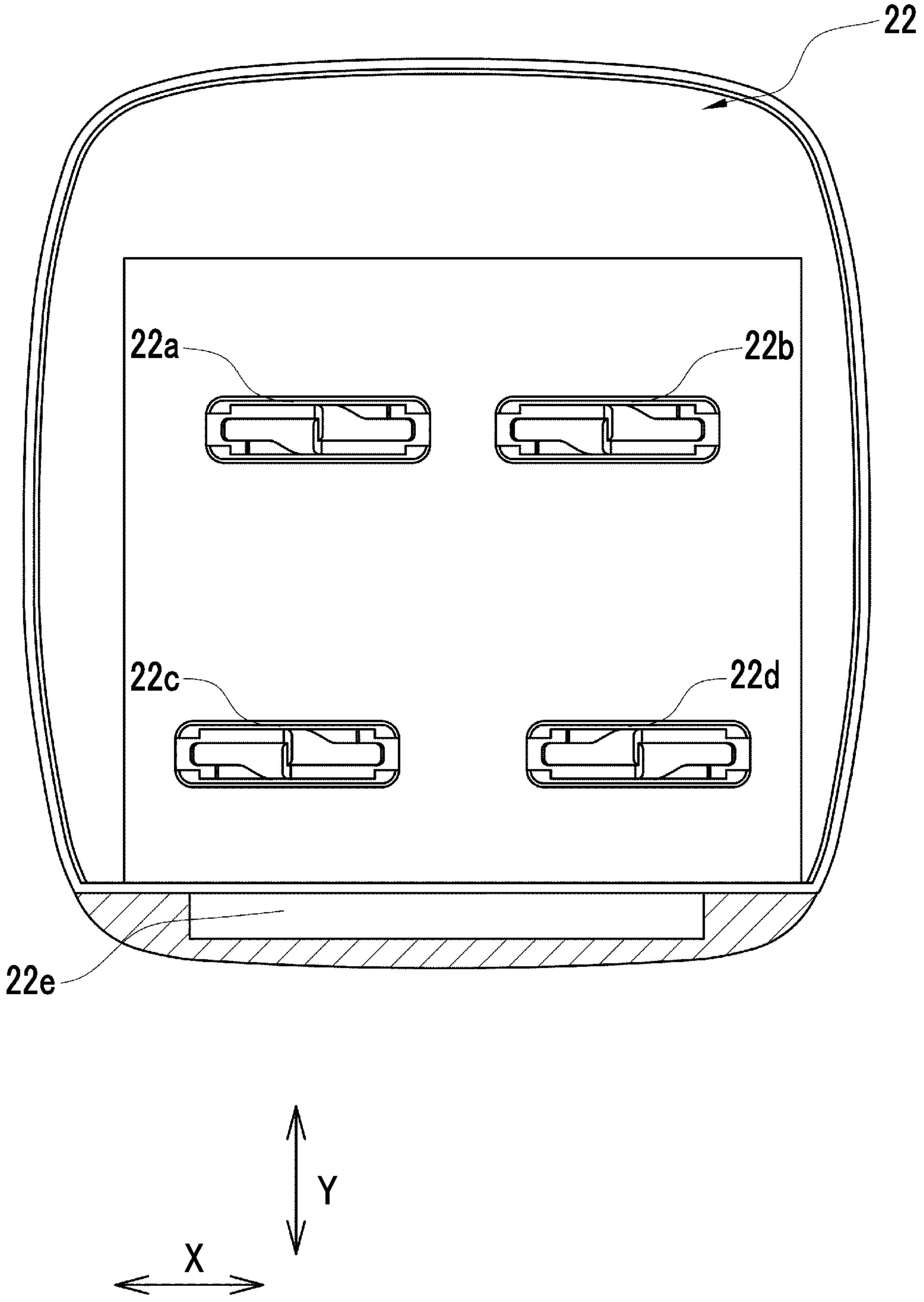
FIG. 20 is a cross-sectional view illustrating the disposing of the film holding portions.

As shown in FIG. 20, the plurality of film holding portions 22*a* to 22*d* are provided in each of the X direction and the Y direction of the loading lid 22 in a case where the loading lid 22 is in the closed position. That is, film holding portions 22*a* and 22*b* and film holding portions 22*c* and 22*d* are arranged in two rows in the Y direction, and further, the film holding portions 22*b* and 22*b* and the film holding portions 22*c* and 22*d* in each row are arranged side in the X direction.

The springs 79 constituting the film holding portions 22*a* to 22*d* may have different spring constants for each of the film holding portions 22*a* to 22*d*. In this case, for example, the spring constants of the springs 79 constituting the film holding portions 22*a* and 22*d* are made larger than the spring constants of the springs 79 constituting the film holding portions 22*b* and 22*b*.

As described above, in the digital camera 10 including a printer, the support ribs 51*c* and 51*d* that support the instant film 28 from the side facing the exposure head 50 are provided between the film pack room 23 and the exposure head 50 in the Y direction. Thus, even though the instant film 28 is curved due to an own weight, the support ribs 51*c* and 51*d* slide with the instant film 28. Accordingly, it is possible to prevent the deterioration in the image quality by suppressing the curving of the instant film 28. Since the plurality of support ribs 51*c* and 51*d* are provided, the sliding resistance received by the instant film 28 can be reduced.

Figure 21:
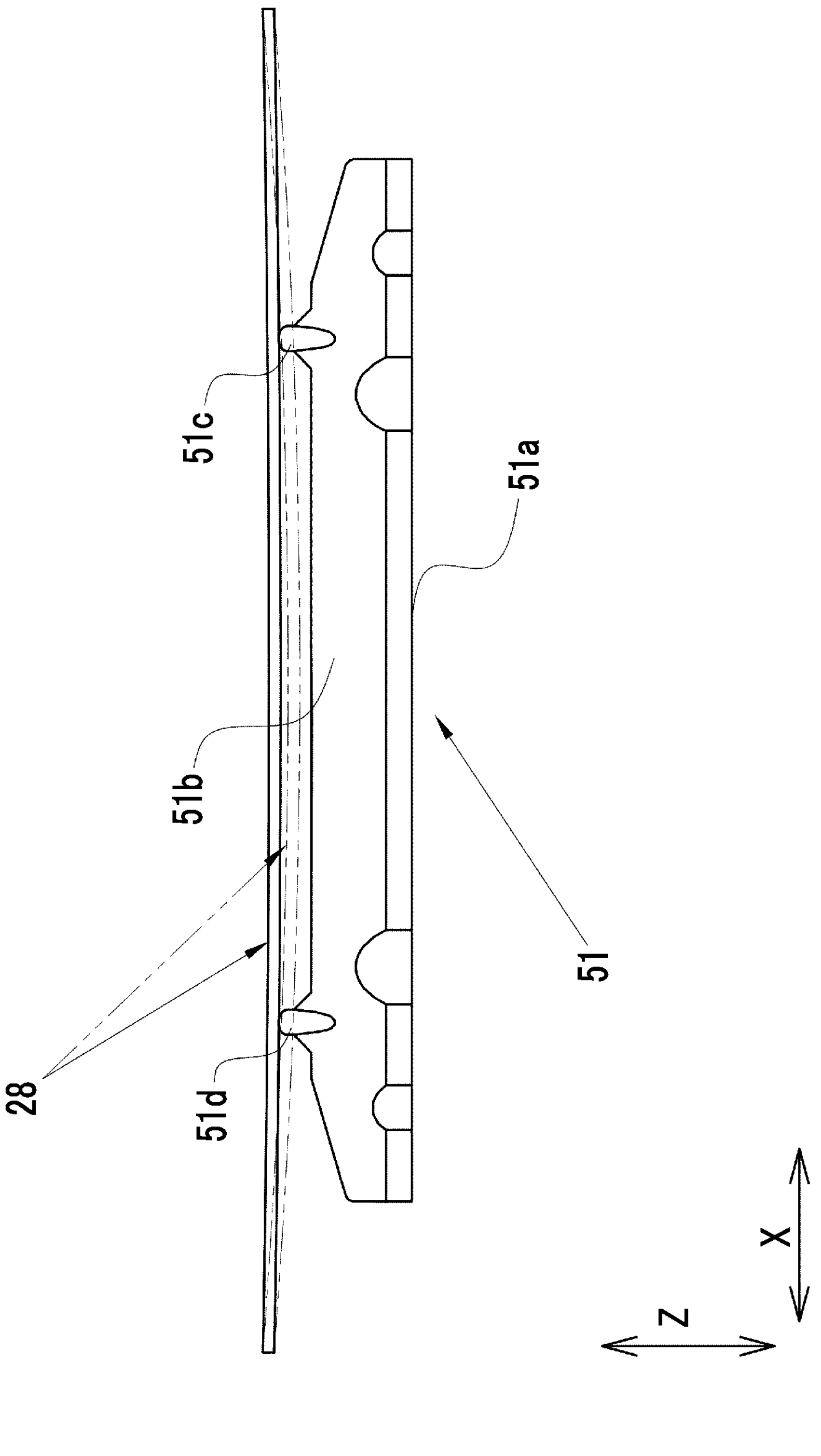
FIG. 21 is an explanatory diagram showing a positional relationship between a support rib and the instant film.

As shown in FIG. 21, in a case where the support ribs 51*c* and 51*d* are not provided, the instant film 28 may bend in the width direction (X direction) due to an own weight (state indicated by a dashed double-dotted line). In this case, the image quality may deteriorate by the amount of curving. On the other hand, in the present invention, since the printer unit comprises the support ribs 51*c* and 51*d*, the curving of the instant film 28 is suppressed to a minimum, and the instant film 28 can be transported to the exposure head 50 and the spreading roller pair 54 while maintaining a substantially planar state (state indicated by a solid line). Accordingly, the deterioration in the image quality can be prevented.

As described above, in the digital camera 10 including a printer, the plurality of film holding portions 22*a* to 22*d* are provided in the X direction and the Y direction of the loading lid 22. Accordingly, it is possible to reduce the spring constants of the springs 79 constituting the film holding portions 22*a* to 22*d*. In a case where one film holding portion is provided in a row as in the printer of the related art, a spring member having a spring constant equal to or greater than a certain value needs to be used in order to constantly press the instant film from a state where all the instant films remain in the instant film pack to a state where the last instant film is left. Accordingly, parts of the film holding portion become large, and an increase in a size of the printer is caused.

In a case where a spring member having a large spring constant is used as in the printer of the related art, a pressing force varies greatly between a state where the number of remaining instant films is large and a state where the last instant film is left. Accordingly, the planar state of the instant film may vary depending on the remaining number, there may be an influence on the transport performance by the transport roller pair, and the image quality may deteriorate. In a case where the variation of the pressing force due to the film holding portion is large, the instant film may be caught in the discharge port.

On the other hand, in the present invention, since the plurality of film holding portions 22*a* and 22*b* or the film holding portions 22*c* and 22*d* are provided in one row, the spring constants of the springs 79 constituting the film holding portions 22*a* to 22*d* can be reduced. Accordingly, the parts of the film holding portions 22*a* to 22*d* can be set to be smaller. Further, the spring constant of the spring 79 is set to be smaller, and thus, it is possible to reduce the variation of the pressing force due to the remaining number of instant films 28. Accordingly, it is possible to prevent the deterioration in the image quality.

Since the plurality of film holding portions 22*a* to 22*d* are provided in the loading lid 22 in the X direction and the Y direction, the spring constants of the springs 79 constituting the film holding portions 22*a* to 22*d* can be different. That is, a degree of freedom of the spring constant in designing the springs 79 constituting the film holding portions 22*a* to 22*d* is increased, and the variation of the pressing force due to the remaining number of instant films 28 can be further reduced.

In the above embodiment, although the coil spring is used as the spring 79, the spring 79 is not limited thereto, and other spring members such as a leaf spring may be used. In the above embodiment, although the example in which the present invention is applied to the digital camera including a printer is used, the present invention is not limited thereto, and the present invention may be applied to a single printer.

In the above embodiment, a hardware structure of a processing unit that executes various kinds of processing such as the controller 59 includes various processors to be described below. The various processors include a central processing unit (CPU) which is a general-purpose processor that functions as various processing units by executing software (program), a graphical processing unit (GPU), a programmable logic device (PLD) such as a field programmable gate array (FPGA) which is a processor capable of changing a circuit configuration after manufacture, a dedicated electric circuit which is a processor having a circuit configuration specifically designed to execute various processing, and the like.

One processing unit may be constituted by one of these various processors, or may be constituted by a combination of two or more processors of the same type or different types (for example, a combination of a plurality of FPGAs, a combination of a CPU and an FPGA, a combination of a CPU and a GPU, or the like). The plurality of processing units may be constituted by one processor. As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one Integrated Circuit (IC) chip is used as represented by a system on chip (SoC). As described above, the various processing units are constituted by using one or more of the various processors as the hardware structure.

Further, more specifically, an electric circuitry in which circuit elements such as semiconductor elements are combined can be used as the hardware structure of these various processors.

Explanation of References

10: digital camera including printer
11: camera body
12: imaging unit
13: printer unit
15: imaging window
16A: release switch
16B: release switch
17: rear display unit
18: operating part
18*a*: menu switch
18*b*: print switch
19: imaging optical system
20: solid-state imaging element
21: film discharge port
22: loading lid
22*a* to 22*d*: film holding portion
22*e*: hinge portion
23: film pack room
23*a*, 23*b*: both side surface
23*c*: cut-off portion
23*d*: positioning protrusion
23*e*: bottom surface
23*f*: elastic member
23*g*: top surface
23*h*: cut-off portion
24: instant film pack
24*a*, 24*b*: side surface
24*c*: protrusion
24*e*: top surface
26: case
27: film press plate
27*a*: sheet
27*b*: sheet
27*c*: opening
27*d*: hole
27*e*: opening
27*f*: hole
27*g*: lower end portion
27*h*: lower end portion
28: instant film
28*a*: exposure surface
30: film cover
31: case member
31*a*: exposure aperture
31*b*: cut-off portion
31*c*: feeding port
31*d*: light shielding seal
32: cover
32*a*: opening
32*b*: unit support protrusion
32*c*: caulking pin
32*d*: support piece
33: mask sheet
33*a*: screen opening
34: photosensitive sheet
35: cover sheet
36: developer pod
37: trap portion
38: developer
39: gap
40: image observation surface
50: exposure head
50*a*: female screw hole
50*b*: positioning protrusion
51: film support member
51*a*: fixed piece
51*b*: protrusion piece
51*c*, 51*d*: support rib
51*e*: fixing hole
51*f*: positioning recess
51*h*: sliding surface
52: roller drive mechanism
53: transport roller pair
54: spreading roller pair
55: spreading control member
55*a*: support member
56: device housing
57: claw member
58: discharge guide
59: controller
60: lens
61: capstan roller
61*a*: spike roller member
61*b*: drive gear
61*c*: rotational shaft
62: pinch roller
62*a*: roller member
62*b*: drive gear
62*c*: rotational shaft
63, 64: spreading roller
66, 67: spring
71: male screw
77: pressing member
77*a*: distal end portion
77*b*: rotational movement shaft
78: holding frame
79: spring
L dimension
P: exposure position

What is claimed is:

1. A printer comprising:

a loading room into which an instant film pack is loaded, the instant film pack including at least a plurality of instant films that each have a developer pod and a case that accommodates the instant films in a stacking manner and that has a feeding port for feeding the instant film formed therein;

an exposure head that exposes an image to the instant film transported from the loading room;

a transport roller that is disposed on a downstream side in a transport direction of the instant film with respect to the exposure head, the transport roller transporting the instant film discharged from the instant film pack to a further downstream side in the transport direction;

a spreading roller that is disposed on the downstream side in the transport direction with respect to the transport roller, the spreading roller spreading a developer by crushing the developer pod in a state of pinching the instant film; and a support rib that is provided between the loading room and the exposure head in the transport direction, the support rib supporting the instant film from a side facing the exposure head, wherein the support rib is disposed at a position spaced from an orbit of the instant film in a case where the instant film is transported while maintaining a planar state without being curved, and at a position where the support rib slides in a case where the instant film is curved due to an own weight, the support rib is formed integrally with a support member that protrudes from the exposure head toward the instant film, and the support member is fixed directly to the exposure head.

2. The printer according to claim 1, wherein a plurality of the support ribs are provided in a width direction orthogonal to the transport direction, each of the support ribs includes a sliding surface that slides on one surface of the instant film, and the sliding surface is formed in a curved shape.

3. The printer according to claim 1, wherein the loading room is formed in a box shape of which one surface is opened, a loading lid that covers the opened surface of the loading room is provided, a film holding portion is provided in the loading lid, the film holding portion pressing a film press plate stored in the case, and the film holding portion includes a pressing member that touches the film press plate and a biasing member that biases the pressing member, and a plurality of the film holding portions are provided in the transport direction and a width direction orthogonal to the transport direction in the loading lid.

4. The printer according to claim 3, wherein the biasing member is a spring member, and the spring member has a spring constant different for each film holding portion.

5. A digital camera including a printer comprising;

the printer according to claim 1; and an imaging unit that includes an imaging optical system, and images a subject image to output image data to the printer.

* * * * *